(12) United States Patent
Angelopoulos et al.

(10) Patent No.: US 6,193,909 B1
(45) Date of Patent: *Feb. 27, 2001

(54) CROSS-LINKED ELECTRICALLY CONDUCTIVE POLYMERS, PRECURSORS THEREOF

(75) Inventors: Marie Angelopoulos, Cortlandt, NY (US); Jeffrey D. Gelorme, Plainville, CT (US); Yun Hsin Liao, West Nyack, NY (US); Jane M. Shaw, Ridgefield, CT (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/595,853

(22) Filed: Feb. 2, 1996

Related U.S. Application Data

(60) Provisional application No. 60/006,759, filed on Nov. 15, 1995.

(51) Int. Cl.$^7$ ........................................... H01B 1/12
(52) U.S. Cl. .................. 252/500; 525/326.6; 525/326.7; 525/327.2; 525/328.1; 525/333.3; 525/540; 528/396; 528/417; 528/422; 528/423; 528/380; 528/373; 522/150; 522/160; 522/151; 522/162; 522/166
(58) Field of Search .................. 252/500; 525/326.6, 525/326.7, 327.2, 328.1, 333.3, 540; 528/380, 373, 396, 417, 422, 423; 522/166, 162, 151, 160, 150

(56) References Cited

U.S. PATENT DOCUMENTS

| | | | |
|---|---|---|---|
| 4,806,271 | 2/1989 | Yaniger et al. | 252/500 |
| 4,851,487 | 7/1989 | Yaniger et al. | 525/540 |
| 4,855,361 | 8/1989 | Yaniger et al. | 525/436 |
| 4,935,163 | 6/1990 | Cameron | 252/500 |
| 5,002,853 | 3/1991 | Aoai et al. | 430/281 |
| 5,086,120 | 2/1992 | Tan et al. | 525/183 |
| 5,115,057 | 5/1992 | Ono et al. | 526/256 |
| 5,126,405 | 6/1992 | Jones et al. | 525/100 |
| 5,147,913 * | 9/1992 | MacDiarmid et al. | 524/104 |
| 5,160,457 | 11/1992 | Elsenbaumer | 252/500 |
| 5,164,465 | 11/1992 | Epstein et al. | 525/540 |
| 5,171,478 * | 12/1992 | Han | 252/500 |
| 5,188,766 * | 2/1993 | Eiffler | 252/500 |
| 5,370,825 | 12/1994 | Angelopoulos et al. | 252/500 |
| 5,378,403 | 1/1995 | Shacklette | 252/500 |
| 5,422,423 * | 6/1995 | Shacklette et al. | 528/422 |

* cited by examiner

Primary Examiner—Margaret G. Moore
(74) Attorney, Agent, or Firm—Thomas A. Beck; Daniel P. Morris

(57) ABSTRACT

Cross-linked electrically conductive polymers, in particular electrically conductive, polyaniline are described. Dopants and substituents having pendant cross-linkable functionality are used which form a cross-linked conducting polymer network. The cross-linking functionality can be hydrogen-bonding as well as chemically polymerizable or cross-linkable. A conjugated path between chains can also be incorporated. The resulting cross-linked conducting polymers have enhanced thermal and environmental stability. The dopant cannot readily be washed out with solvents or diffuse out upon exposure to heat. In addition, the cross-linked polymers have enhanced electrical conductivity.

44 Claims, 22 Drawing Sheets

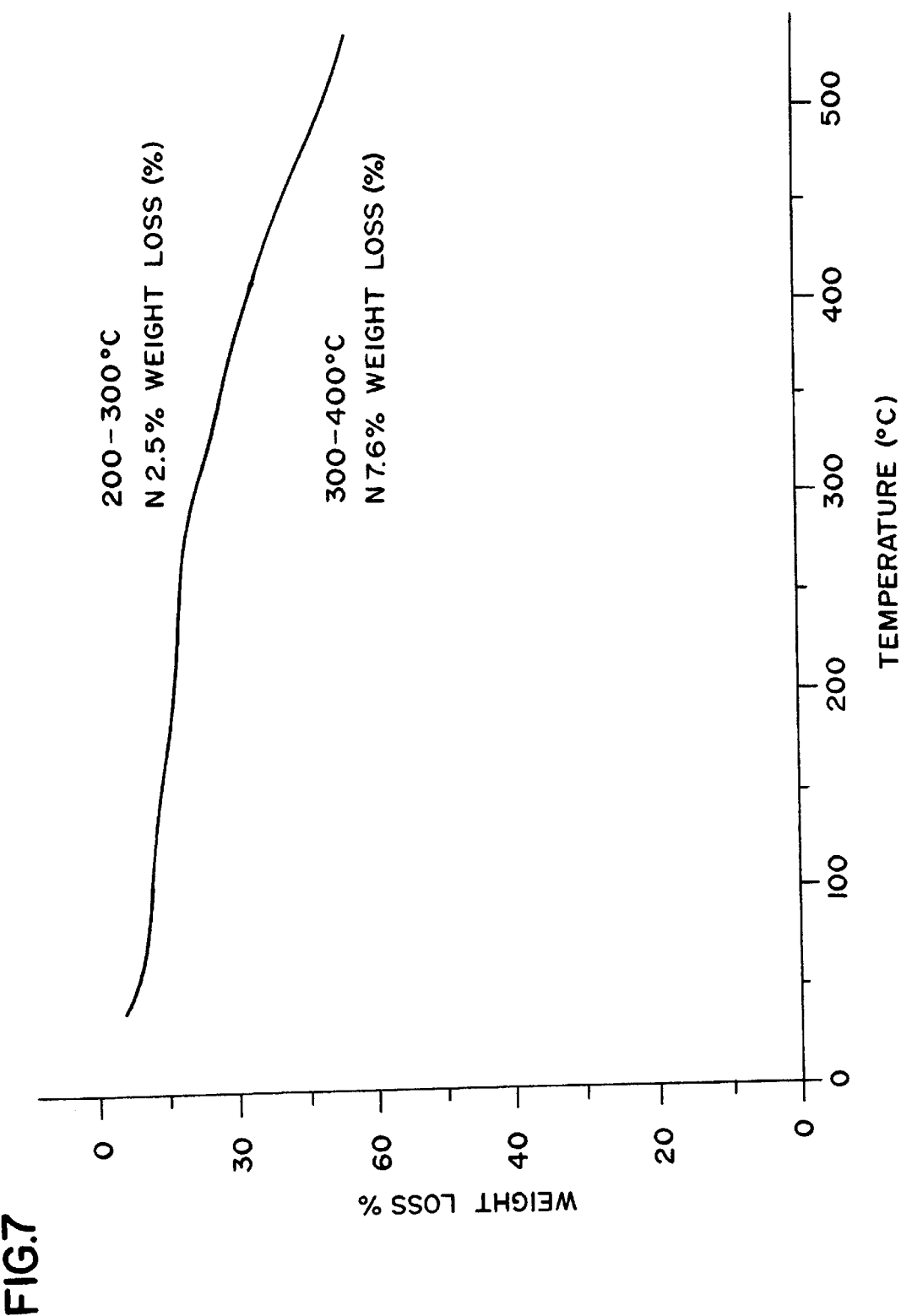

$-CH_2CH_2OH$ $-CH_2OH$ $-CH_2SH$ $-CH_2CH_2SH$ $-CH_2CH_2COOH$ $-CH_2COOH$ $-CH_2SO_3H$ $-CH_2CH_2SO_3H$ $-COOH$ $-SO_3H$ $-COO^-M^+$ $-\overset{O}{\underset{\|}{C}}-CH_3$ $-\underset{\underset{OH}{|}}{B}-OH$ $-\overset{O}{\underset{\underset{O}{\|}}{\underset{\|}{S}}}-NH_2$ $-C-NH_2$ $-SO_3^-M^+$ $-C\equiv CH$ $-HC=CH_2$ $-HC=C-\overset{O}{\overset{\|}{C}}-OCH_3$

FIG.16

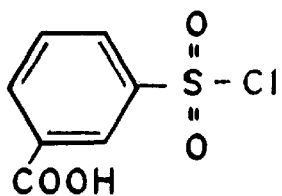
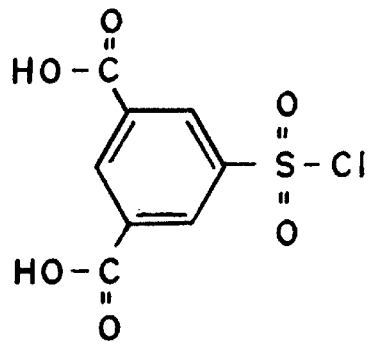
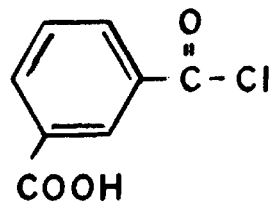
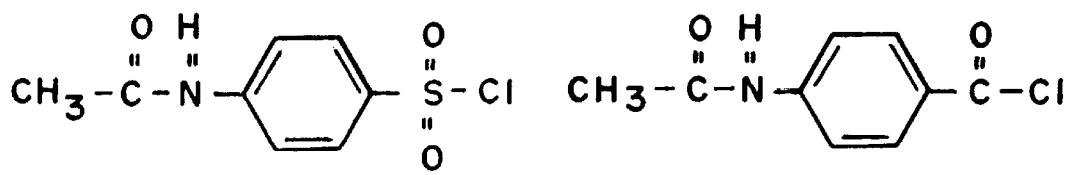
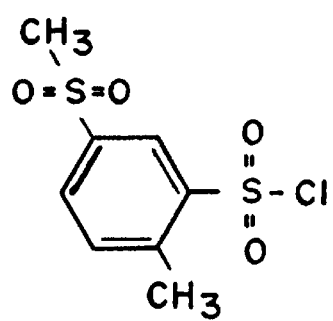
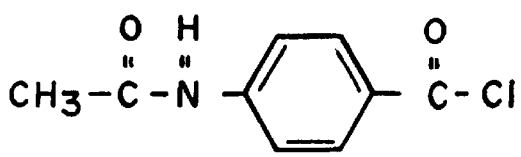
FIG.17

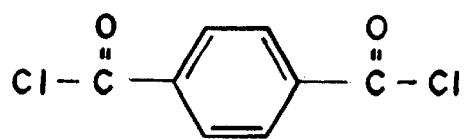
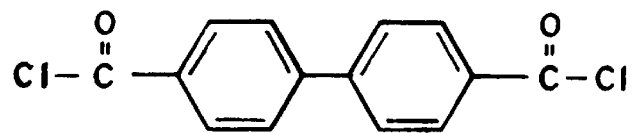
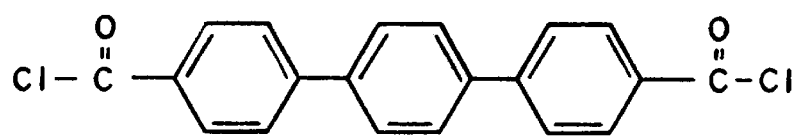
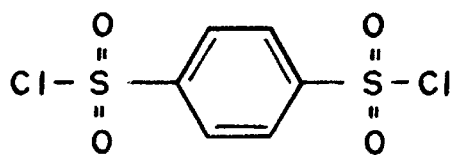
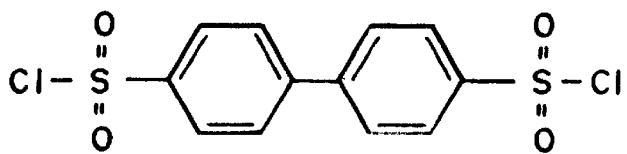
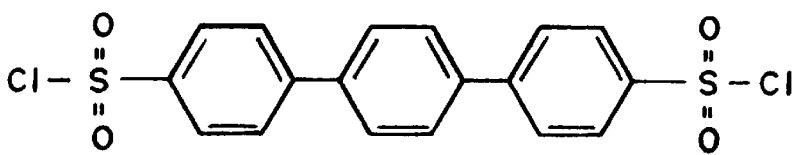
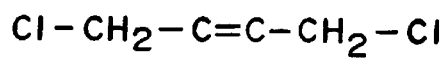
FIG.18

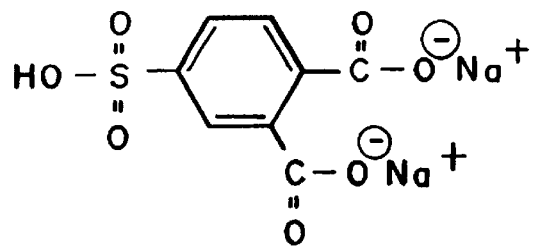
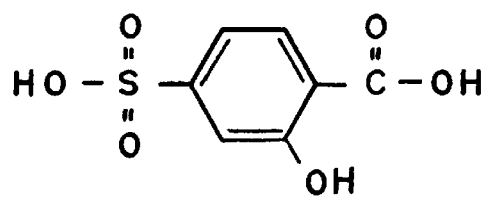
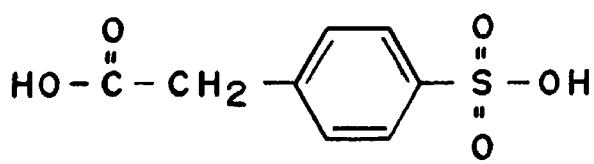
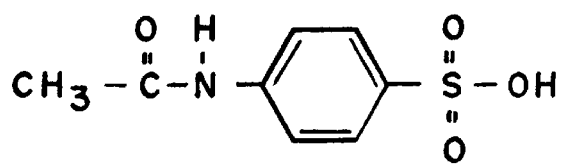
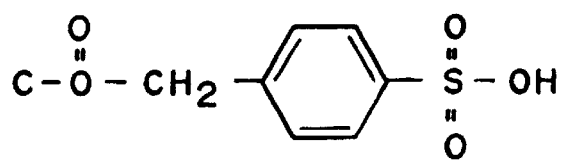
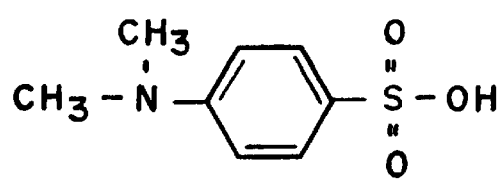
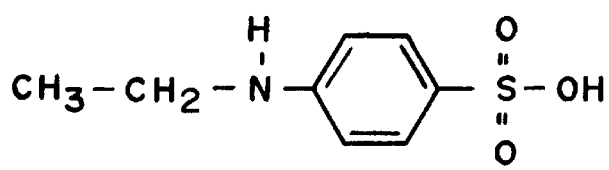
FIG.19A

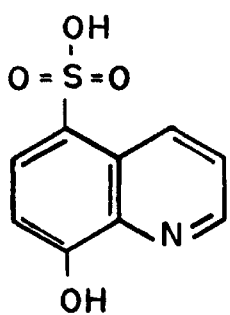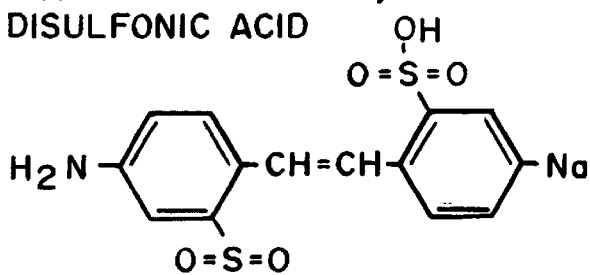
4,4' DIAMINOSTILBENE-2,2' DISULFONIC ACID
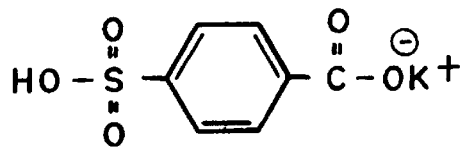
AMINONAPHTHALENE SULFONIC ACID
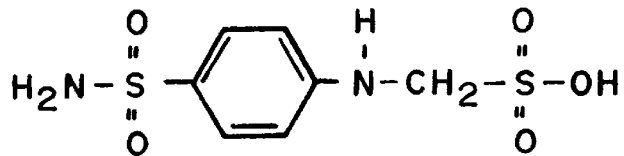
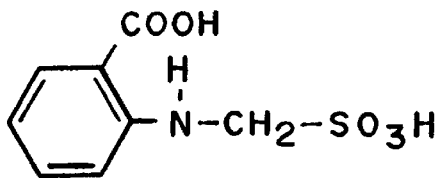
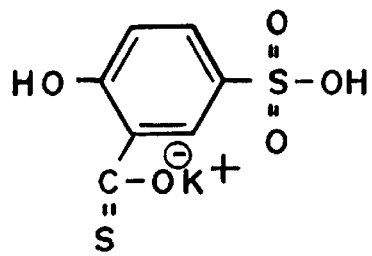
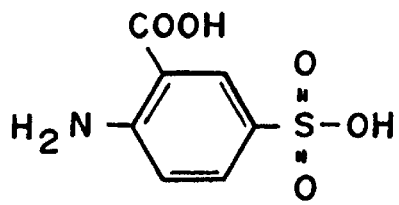
FIG.19B $$\left[\begin{array}{c}X\\ \cdot\\ A\\ \cdot\\ Q\end{array}\right]_{M_1} \left[\begin{array}{c}Z\\ \cdot\\ Q\\ \cdot\\ A\end{array}\right]_{M_2} \left[\begin{array}{c}A\\ \cdot\\ Q\\ \cdot\\ Q\\ \cdot\\ A\end{array}\right]_{M_3} \left[\begin{array}{c}Q\\ \cdot\\ A\\ \cdot\\ A\\ \cdot\\ Q\end{array}\right]_{M_4}$$

FIG. 20

$$\left[\begin{array}{c}X\\ \cdot\\ A\\ \cdot\\ Q\end{array}\right]_{M_1} \left[\begin{array}{c}Z\\ \cdot\\ Q\\ \cdot\\ A\end{array}\right]_{M_2} \left[\begin{array}{c}A\\ \cdot\\ Q\\ \cdot\\ Q\\ \cdot\\ A\end{array}\right]_{M_3} \left[\begin{array}{c}Q\\ \cdot\\ A\\ \cdot\\ A\\ \cdot\\ Q\end{array}\right]_{M_4}$$

FIG. 21

$$Q^{\pm}\left\{\begin{array}{c|c} & \overbrace{\phantom{xx}}^{2}\\ & A^{-}Z\\ A & -Q^{+}X \end{array}\right.$$

FIG. 22

$$\left\{\begin{array}{c} \overbrace{\phantom{xx}}^{2}\\ R^{B}\\ R^{R} \end{array}\right.$$

FIG. 23

CROSS-LINKED ELECTRICALLY CONDUCTIVE POLYMERS, PRECURSORS THEREOF

CROSS-REFERENCE TO RELATED APPLICATIONS

U.S. application Ser. No. 08/594,680, now U.S. Pat. No. 6,030,550, entitled Methods of Fabrication of Cross-Linked Electrically Conductive Polymers and Precursors Thereof, filed on the same day herewith to M. Angelopoulos et al., the teaching of which is incorporated herein by reference.

This application claims priority from Provisional Application Serial No. 60/006,759 filed on Nov. 15, 1995.

FIELD OF THE INVENTION

The present invention is directed to cross-linked electrically conductive polymer precursors and cross-linked electrically conducting polymers having high thermal stability, environmental stability and high conductivity and methods of fabrication thereof and applications thereof.

BACKGROUND

Electrically conductive organic polymers have been of scientific and technological interest since the late 1970's. These relatively new materials exhibit the electronic and magnetic properties characteristic of metals while retaining the physical and mechanical properties associated with conventional organic polymers. Herein, we describe substituted and unsubstituted electrically conducting polyparaphenylene vinylenes, polyparaphenylenes, polyanilines, polythiophenes, polyazines, polyfuranes, polypyrroles, polyselenophenes, poly-p-phenylene sulfides, polyacetylenes, combinations thereof and blends thereof with other polymers and copolymers of the monomers thereof. These materials have a large number of potential applications in such areas such as electrostatic charge/discharge (ESC/ESD) protection, electromagnetic interference (EMI) shielding, resists, electroplating, corrosion protection of metals, and they can ultimately replace metal in such areas as solder, wiring, etc. For these applications to be successful, these materials need to have good environmental and thermal stability and to replace metal, high levels of electrical conductivity is needed.

These polymers are made electrically conducting by exposure to a dopant. The dopants are most commonly monomeric in nature, however, polymeric dopants have also been used. The dopants most commonly used, to date, are readily washed out from the polymer by water, ammonium hydroxide, certain solvents, etc. In addition, the dopants can diffuse out or can degrade upon heating. In the above situations, the conductivity of the polymer decreases and at the extreme case, the dopant is removed completely, rendering the polymer non-conducting.

Since the doped electrically conducting polymer can readily lose the dopant upon exposure to certain environmental conditions, polymers doped with, in particular monomeric dopants and some polymeric dopants, cannot be used in certain environments.

The polyaniline class of conducting polymers has been shown to be the most suitable of such materials for commercial applications. Great strides have been made in making the material quite processable and thus has allowed coatings to be developed and commercialized for numerous applications.

However, a great number of applications have not yet been realized because of certain limitations characteristic of the current polyaniline derivatives.

In many of the potential applications, the conducting polyaniline needs to be blended with suitable thermoset or thermoplastic resins that have the appropriate mechanical and physical properties required for a given application. The compositions are typically processed by processes such as injection or compression molding; these processes require high temperature. For example, polycarbonate which is most commonly used in the fabrication of computer housings, keyboards, etc. is processed at temperatures exceeding 200° C.

At these temperatures the current polyaniline derivatives tend to lose significant conductivity due to evaporation or decomposition of the dopant molecules. To date, none of the conducting polyanilines will survive temperatures exceeding 200° C. for any significant period of time without loss of some level of conductivity. Thus, polyaniline cannot be processed with polycarbonate to result in a blend which has sufficient conductivity for ESD and in particular EMI shielding applications.

The temperature at which the dopant molecule is lost depends on the particular nature of the dopant. The non-conducting form or the non-doped form of the polyaniline is thermally stable to temperatures exceeding 400° C. FIG. 1 shows the thermogravimmetric analysis (TGA), weight loss versus temperature curve, for a polyaniline base (non-conducting form). No significant weight loss is observed to temperatures of 400° C. Polyaniline doped with volatile acids such as hydrochloric acid (HCL), tend to lose significant conductivity at 100° C. The use of organic acids such as sulfonic acids tend to give higher thermal stability. However, for the typical sulfonic acids commonly used, significant loss of conductivity occurs at 200° C. FIG. 2 shows a TGA curve for Versicon™ of Allied Signal, a polyaniline doped with a typical sulfonic acid. As can be seen 39% weight loss occurs between 200 and 300° C. accompanied by a significant loss in conductivity. It is therefore desirable to increase the thermal stability of the conducting polyaniline.

The environmental stability of the conducting polyaniline also needs to be improved. Although the conductivity of the polymer does not degrade in ambient conditions, it does degrade upon exposure to water and alkaline solutions and in certain cases upon exposure to solvents.

Both of the above limitations stem from the very nature of the doping mechanism of polyaniline. Polyaniline is converted into a conductor by reacting the non-conducting precursor form of the material with suitable dopants, most commonly protonic acids. This route has been extensively studied in that numerous derivatives and variations exist. However, the N—H bond is very labile and therefore, base and water can easily abstract the proton and render the material non-conducting. Also, the thermal stability of these doped forms is limited by the volatility/stability of the acid used as discussed above.

One variation of this doping mechanism has been to use organic, non-protonic acid dopants, such as methylating agents or acid chlorides etc. (1) which result in a covalent bond with the dopant. This does show some improvement in the stability of the conducting form of the polyaniline. However, further advances are still necessary.

Furthermore, a third limitation exhibited by the polyanilines, as well as some of the other conducting polymers, is their conductivity being on the low end of the metallic regime. In order for these materials to compete with metals in certain applications such as interconnect technologies, the conductivity of these materials need to be increased. The conductivity is governed by the mobility of the carriers-the mobility of the carriers along the chain as well as between chains. The intrachain mobility is governed by the chain conformation, degree of conjugation, and chain defects. The interchain mobility is determined by the polymer crystallinity, degree of order, interchain distance, and the presence or absence of any interchain interactions. It is generally the interchain mobility that tends to be more critical in limiting the conductivity as the carriers need to hop from one chain to another. Because there is no connecting path between chains, the hopping is a slow process. It is therefore desirable to enhance the interchain mobility of the carriers and to also improve the intrachain mobility in these polymers to achieve higher levels of conductivity.

OBJECTS

It is an object of the present invention to provide precursors to electrically conductive polymers and electrically conductive polymers having cross-linkable functionality, e.g., dopants, substituents, etc., and to provide cross-linked precursors and cross-linked electrically conductive polymers.

It is another object of the present invention to provide a cross-linked precursor to an electrically conductive polymer and a cross-linked electrically conductive polymer.

It is another object of the present invention to provide a dopant for an electrically conducting polymer which results in an environmentally stable conducting polymer.

It is another object of the present invention to provide an electrically conducting polymer which contains a dopant which is not substantially washed out when the conducting polymer is exposed to a solvent, water and alkaline solutions and the like.

It is another object of the present invention to provide an electrically conducting polymer containing a dopant which is not substantially removed when the conducting polymer is exposed to heat.

It is another object of the present invention to provide an environmentally stable electrically conducting polymer containing a dopant which induces cross-links to create a cross-linked conducting polymer network and a network which substantially prevents the dopant from being removed upon exposure to a solvent or to elevated temperature.

It is another object of the present invention to provide a cross-linked conducting polymer matrix from which the dopant is not easily abstractable.

It is another object of the present invention to substantially reduce the diffusion of a liquid, in particular water and solvents, into an electrically conductive polymer material by providing a cross-linked matrix which prevents swelling of an electrically conductive material and attack by water and solvents.

It is another object of the present invention to achieve higher electrical conductivity in an electrically conductive polymer by incorporating conjugated pathways between chains.

It is another object of the present invention to increase the conductivity of electrically conductive polymers by increasing the interchain interactions by physical or chemical cross-linking.

It is another object of the present invention to provide a method of controlling interchain distance.

It is another object of the present invention to provide a method of reducing interchain distance.

It is another object of the present invention to provide a method of increasing interchain distance.

It is another object of the present invention to provide a method of introducing an interchain conjugated pathway.

It is another object of the present invention to provide a method of enhancing metallic island size beyond 200 Å.

It is another object of the present invention to provide a method of enhancing order.

It is another object of the present invention to provide a method of increasing intrachain mobility.

It is another object of the present invention of providing a method of increasing interchain mobility.

It is another object of the present invention to provide a method of increasing carrier mobility and electroluminescence properties of electrically conductive polymers and precursors to electrically conductive polymers for light emitting diodes (LED's) or devices (transistors).

It is another object of the present invention to provide a method of incorporation of cross-linkable monomers or oligomers such as acylates, epoxies, etc., with the cross-linked conducting polymer or precursors to result in a highly cross-linked matrix, an abrasion resistant matrix or to form a thermoset adhesive.

It is another object of the present invention to provide a method of blending above conductive polymers or precursors with thermoplastic or thermoset polymers or oligomers.

SUMMARY OF THE INVENTION

A broad aspect of the present invention is a precursor to an electrically conductive polymer having cross-linkable functionality and an electrically conductive polymer having cross-linkable functionality.

In a more particular aspect of the present invention, the cross-linkable functionality is cross-linked to form a cross-linked precursor to an electrically conductive polymer and a cross-linked electrically conductive polymer.

In another more particular aspect of the present invention the cross-linking forms a network of electrically conducting polymer molecules or a network of precursor molecules.

In another more particular aspect of the present invention a conjugated group is incorporated between precursor molecules or between electrically conductive polymer molecules.

In another more particular aspect of the present invention, a substituent on the polymer backbone induces cross-linking between polymer chains.

In another more particular aspect of the present invention, a dopant induces cross-linking in an electrically conductive polymer.

Another more particular aspect of the present invention is a cross-linked conducting polymer or conducting polymer precursor wherein the cross-links are due to hydrogen bonding.

Another more particular aspect of the present invention is a cross-linked conducting polymer or conducting polymer precursor wherein the cross-links are due to actual chemical bonding.

In another more particular aspect of the present invention, the dopant is a protonic acid.

In another more particular aspect of the present invention, the dopant is a protonic acid with pendant cross-linkable groups.

In another more particular aspect of the present invention, the counteranion of the protonic acid doped conducting polymer contains a cross-linkable group which induces cross-linking forming a cross-linked network.

In another more particular aspect of the present invention, the dopant is a Lewis acid or electrophile such as an alkyl halide, acid chloride, sulfonyl chloride, epoxy, anhydride, silyl halide, etc.

In another more particular aspect of the present invention, the dopant is a Lewis acid or electrophile of the type above having pendant cross-linkable groups.

In another more particular aspect of the present invention, the Lewis acid dopant containing a cross-linkable agent covalently bonds to the conducting polymer precursor resulting in a cross-linked conducting polymer wherein the cross-linking is through the main chain.

In another more particular aspect of the present invention, a substituent on the polymer backbone induces cross-linking in the form of hydrogen bonding between chains resulting in a cross-linked conducting polymer precursor or a cross-linked conducting polymer.

In another more particular aspect of the present invention, a substituent on the polymer backbone induces chemical cross-linking resulting in a cross-linked conducting polymer precursor or a cross-linked conducting polymer.

In another more particular aspect of the present invention, a substituent on the polymer backbone introduces a conjugated group between chains.

In another more particular aspect of the present invention, a cross-linked conducting polymer precursor is doped by a non-cross-linkable dopant.

In another more particular aspect of the present invention, a cross-linked conducting polymer precursor is doped by a cross-linkable dopant.

In another more particular aspect of the present invention, cross-linking is initiated by exposure to energy such as upon exposure to radiation or heat.

In another more particular aspect of the present invention, the cross-linking is initiated by a bifunctional dopant.

In another more particular aspect of the present invention, the cross-linking is initiated by a substituent on the polymer backbone.

BRIEF DESCRIPTION OF THE DRAWINGS

Further objects, features, and advantages of the present invention will become apparent from a consideration of the following detailed description of the invention when read in conjunction with the drawings FIG's. in which:

FIG. 7 is a TGA of polyaniline is doped with 4-sulfophthalic acid sodium salt, prepared by the in-situ polymerization of aniline in the sulfonic acid.

FIG. 16 shows examples of R groups having hydrogen bonding functionality.

FIG. 17 shows examples of dopants having form X—QA, wherein X is an hydrogen bonding functionality.

FIG. 18 shows examples of organic bifunctional dopants having the form AQ—QA.

FIG. 19 shows examples of dopants having form QA—Z, wherein Z is an hydrogen bonding functionality.

FIG. 20 schematically shows the structure of polydopants having polyfunctional cross-linking groups useful to practice the present invention.

FIG. 21 schematically shows a copolymer of the polyfunctional dopants shown in FIG. 9.

FIG. 22 schematically shows a precursor polymer doped with dopants of various forms.

FIG. 23 schematically shows a precursor polymer having cross-linkable groups $R^B$ and $R^R$.

DETAILED DESCRIPTION

The present invention is directed to enhancing the electrical conductivity and thermal, and environmental stability of polymer materials, which when doped, are electrically conducting. This is achieved by inducing cross-linking between polymer molecules. The term cross-lining as used herein refers to physical and chemical interactions between polymer molecules which includes hydrogen bonding interactions and actual chemical cross-linking, e.g., carbon-carbon bond formation, et. The cross-linking results in an increase in the electrical conductivity as compared to doped polymers without the cross-link as a result of increased ordering of the resulting polymer material, increased interchain interactions, and a connecting pathway either conjugated or non-conjugated between chains which facilitates interchain mobility. Moreover, the cross-links provide the resulting polymer material with physical properties which materials without the cross-links do not have, such as to permit forming a free standing film of the precursor or electrically conductive polymer, with good mechanical properties. Cross-linking also increases the thermal and environmental stability of these polymers by making diffusion of solvents and other such materials into the cross-linked matrix difficult and thus hinders attack or dopant removal by solvents. In addition, thermal loss of the dopant is reduced. Examples of polymers which can be used to practice the present invention, are substituted and unsubstituted homopolymers and copolymers of aniline, thiophene, benzene, vinyl benzene, pyrrole, p-phenylene sulfide, acetylenes, azines, selenophenes, furans, such as substituted and unsubstituted polyparaphenylenes, polyparaphenylevevinylenes, polyanilines, polyazines, polythiophenes, poly-p-phenylene sulfides, polyfuranes, polypyrroles, polyselenophenes, polyacetylenes and combinations thereof, and copolymers of monomers thereof and blends thereof. The general formula for these polymers can be found in U.S. Pat. 5,198,153 to Angelopoulos et al. The non-doped form of these polymers is referred to herein as the precursor to the electrically conducting polymer, the precursor becomes the electrically conducting polymer upon doping.

While the present invention will be described with reference to a preferred embodiment, it is not limited thereto. One type of polymer which is useful to practice the present invention is a substituted or unsubstituted polyaniline or copolymers of polyaniline or blend of polyaniline with another polyaniline derivative or a blend of polyaniline with other polymers.

The emeraldine base form of polyaniline is soluble in various organic solvents and in various aqueous said solutions. Examples of organic solvents are dimethylsufoxide (DMSO), dimethylformamide (DMF) and N-methylpyrrolidinone (NMP).

Figure 3:
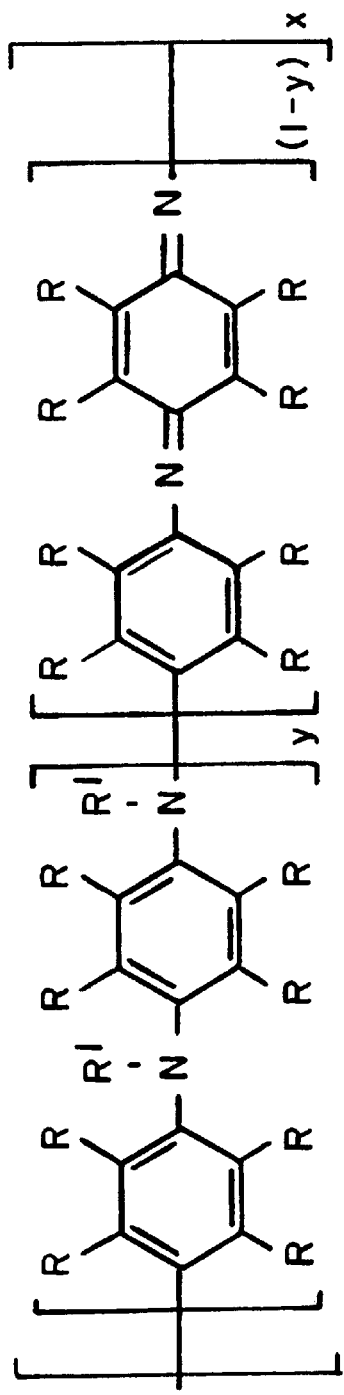
FIG. 3 is a general formula for an undoped polyaniline, the precursor to an electrically conductive polyaniline.

Polyaniline in the non-doped precursor form has the general formula shown in FIG. 3, wherein each R can be H or any organic or inorganic radical, each R can be the same or different, each $R^1$ can be H or any organic or inorganic radical, each $R^1$ can be the same or different; $x \geq 1$; preferably $x \geq 2$ and y has a value from 0 to 1. Examples of organic radicals are alkyl or aryl radicals. Examples of inorganic radicals are Si and Ge containing radicals. This list is exemplary only and not limiting. The most preferred embodiment is the emeraldine base form of the polyaniline wherein y has a value of approximately 0.5. More details on polyaniline can be found in U.S. Pat. No. 5,198,153, the teaching of which is incorporated herein by reference.

Figure 4:
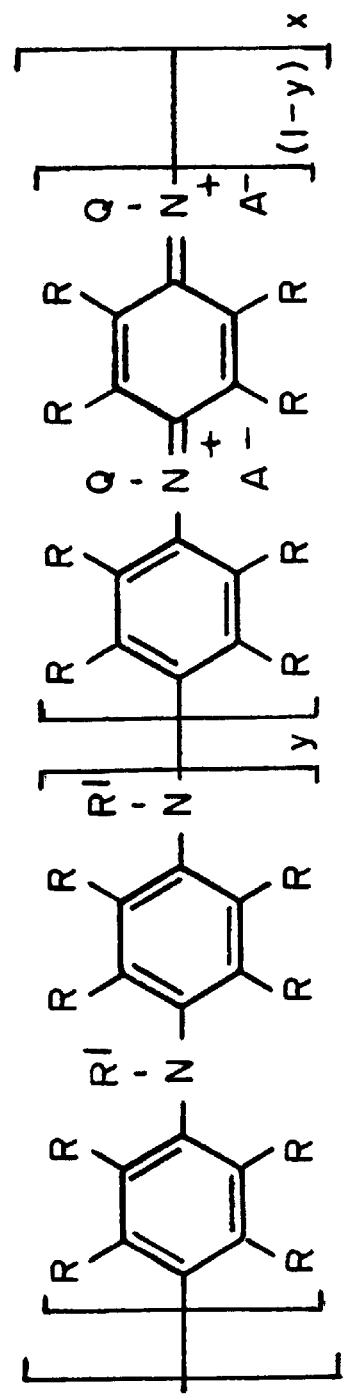
FIG. 4 is a general formula for a doped polyaniline, depicted in the dication bipolaronic form.

FIG. 4 depicts doped polyaniline in the dication bipolaronic form. If the polyaniline base is exposed to cationic species QA, the imine nitrogen atoms of the polymer (electron rich site) react with the QA ($Q^{\delta+} \ldots A^{\delta-}$) forming a salt as shown in FIG. 4, wherein the $Q^+$ becomes attached to the nitrogen (N—Q) forming a positively charged polymer backbone and the $A^-$ becomes the counteranion of the polymer. $Q^+$ can be selected from H+ and organic and inorganic cations, for example, an alkyl group or a metal.

QA can be a protic acid where Q is hydrogen. When a protic acid HA is used to dope the polyaniline, the nitrogen atoms of the imine part of the polyaniline are protonated.

Figure 5:
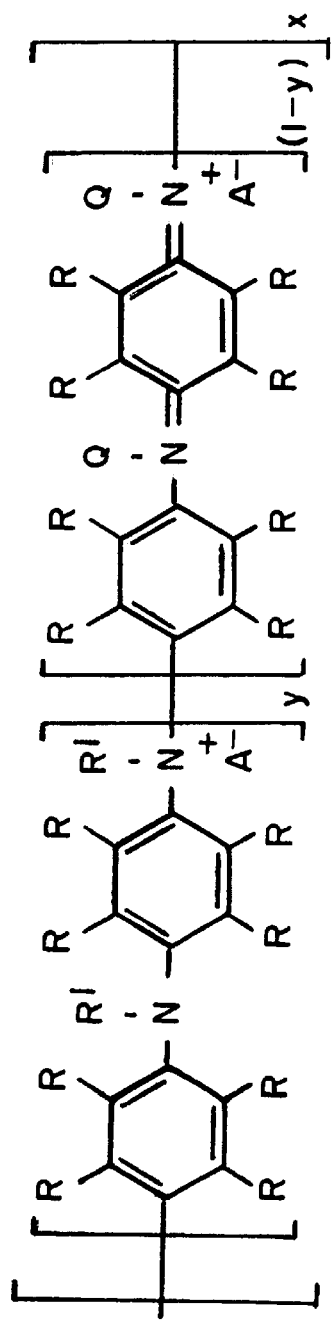
FIG. 5 is a general formula for the polysemiquinone radical cation or polaron form of doped polyaniline.

The doped emeraldine salt form is greatly stabilized by resonance effects. The charges distribute through the nitrogen atoms and aromatic rings making the imine and amine nitrogens indistinguishable. The actual structure of the proton doped form is a delocalized polysemiquinone radical cation (polaronic structure) of which one resonance structure is shown in FIG. 5.

In the case where $R^1$ and Q are not the same, the doped polymer becomes asymmetrical which may cause some localization of the charge. The doped polymer in that case may exist in the bipolaronic dication structure shown in FIG. 4 as opposed to the polysemiquinone radical cation or polaronic structure shown in FIG. 5 or can exist in a hybrid structure. For simplicity, the present invention will be described using FIG. 4 as the model structure for the doped polymer.

The dopant (QA) can be modified to allow cross-linkable groups to be introduced into the (e.g. polyaniline) structure which can subsequently be used to induce cross-linking. This can be accomplished in a number of ways which are outlined below. Also, the backbone substituents (R and $R^1$) of the polymer can be modified to which can subsequently be used to induce cross-linking.

FIG. 22 schematically shows a precursor polymer 2 to an electrically conductive polymer doped with a dopant of form XQA and QAZ, wherein, as described in detail below, X and Z can have hydrogen bonding and chemical cross-linkable functionality.

FIG. 23 schematically shows a precursor polymer 2 having groups $R^B$ and $R^R$ on the backbone and rings respectively, wherein, as described in detail below, can have hydrogen bonding and chemical cross-linkable functionality.

Figure 24:
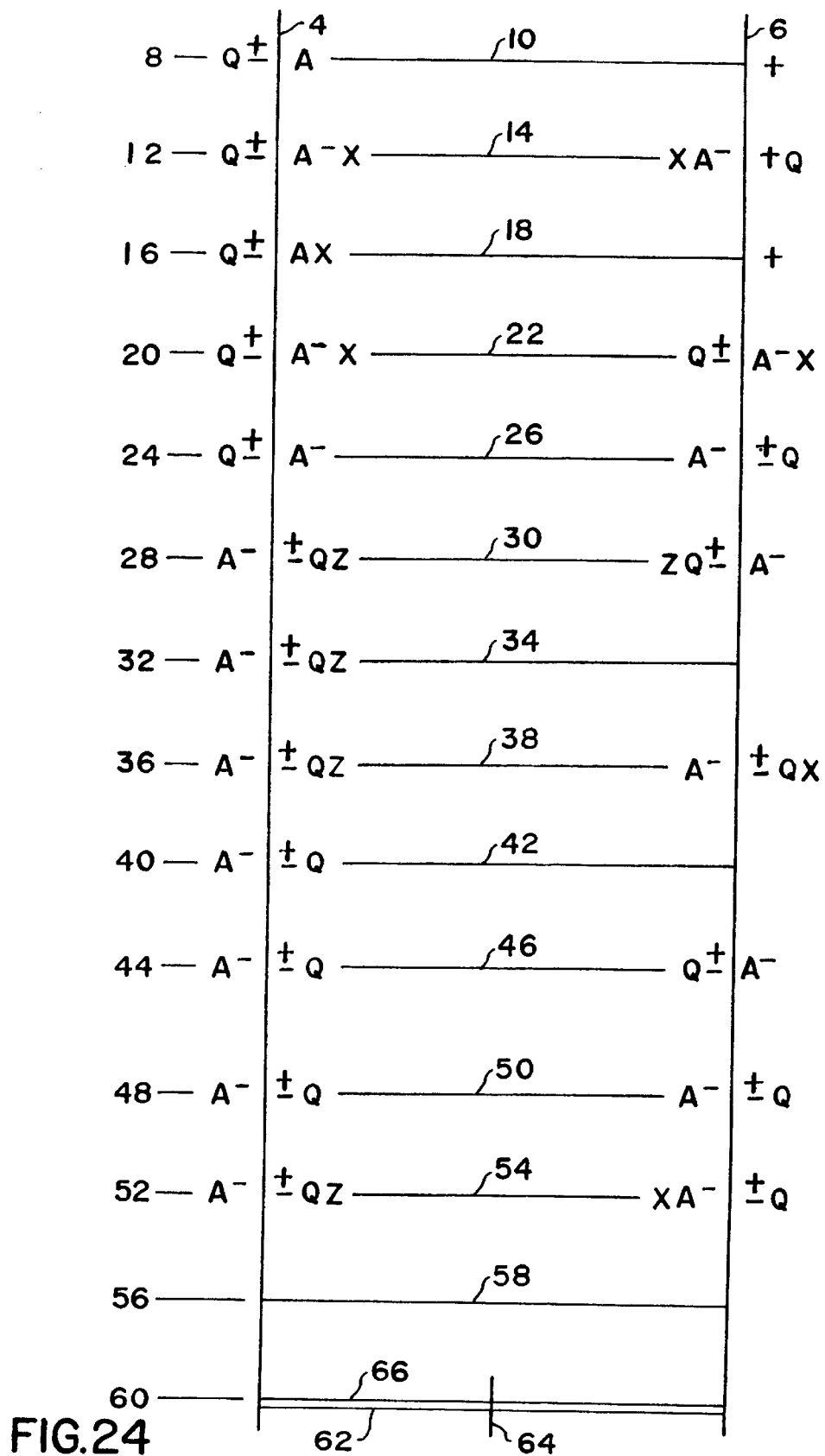
FIG. 24 schematically shows the polymers of FIGS. 22 and 23 cross-linked through the cross-linkable dopants and groups.

FIG. 24 schematically shows precursor polymer chain 4 and precursor polymer chain 6 showing examples of types cross-linking of chain 4 to chain 6. Although the cross-linking is shown only between two chains, it can occur between many chains and within sites on the same chain. At location 8, chain 4 is doped with a dopant of form QA, wherein A has cross-link functionality (e.g. hydrogen bonding) which forms a bond (e.g. hydrogen bond) to chain 6. At location 12, chain 4 and chain 6 are doped with a dopant of form QAZ, wherein Z has cross-link functionality which forms a cross-link 14 between the Z substituents on chains 4 and 6. At location 16, chain 4 is doped with a dopant of form QAZ, wherein Z has cross-link functionality which forms cross-link 18 the backbone of chain 6. At location 20, chains 4 and 6 are doped with a dopant of form QAZ, wherein both Q and Z have cross-link functionality, which forms cross-link 22. At location 24, chains 4 and 6 are doped with dopant QA which form cross-link functionality which forms cross-link 26 between chains 4 and 6. Alternatively, before chain 4 or 6 is doped with such a dopant, the dopant can be cross-linked to form polyfunctional dopant QA—AQ which, when used to dope chains 4 and 6, will result in cross-link 26. Alternatively, a polyfunctional dopant of form QA—AQ which is not necessarily synthesized by cross-linking, can be used to form the link (referred to herein as a cross-link) 26 between chains 4 and 6. At location 28, chains 4 and 6 are doped with a dopant of form AQX, wherein X has cross-link functionality which forms cross-link 30 between the X groups. At location 32, chain 4 is doped with a dopant of form AQX, wherein the X group has a cross-link functionality which forms cross-link 34 to chain 6. At location 36, chain 4 is doped with a dopant of form AQX and chain 6 is doped with a dopant of form AQX, wherein both X and A have cross-link functionality which form cross-link 38 between the X and A on chains 4 and 6 respectively. At location 40, chain 4 is doped with a dopant of form AQ, wherein Q has cross-link functionality which form cross-link 42 to the backbone of chain 6. At location 44, chains 4 and 6 are doped with a dopant of form AQ, wherein Q has cross-link functionality which forms cross-link 46 between chains 4 and 6. Alternatively, before chain 4 or 6 is doped with such a dopant, the AQ—QA which, when used to dope chains 4 and 6, will result in cross-link 46. Alternatively, a polyfunctional dopant of form AQ—QA which is not necessarily synthesized by cross-linking, can be used to form the link (referred to here as a cross-link) 46 between chains 4 and 6. The examples of cross-linking shown schematically in FIG. 24, is representative and not limiting. Specific examples of these and others are described herein below. At location 48, chains 4 and 6 are doped with a dopant AQ, wherein both A and Q have cross-link functionality which form cross-link 50 between a Q and A on chains 4 and 6, respectively. At location 52, chain 4 is doped with dopant AQZ and chain 6 is doped with dopant QAX wherein X and Z have cross-link functionality which form cross-link 54 between chains 4 and 6. At location 56, chains 4 and 6 have cross-link functionality on the backbone or on rings on the backbone which form cross-link 58. At location 60, cross-link 62 shown as a bold line can be any one of the above described cross-links between chains 4 and 6. Cross-link 62 can have substituents represented by 64 and 66 (which can be within the cross-link or pendent groups in the cross-link) which can cross-link, (such as an unsaturated carbon-carbon bond and a hydrogen bond) to other cross-links such as 64 and 66 forming an extended cross-link network. Also, any one of the above described cross-link functionality can be a polymeric polyfunctional dopant as schematically shown in FIG. 20 or a copolymer as schematically shown in FIG. 21 which can also form an extended cross-linked network.

1. Protonic Acid Dopants with Pendent Hydrogen-Bonding Functionality

Figure 6A:
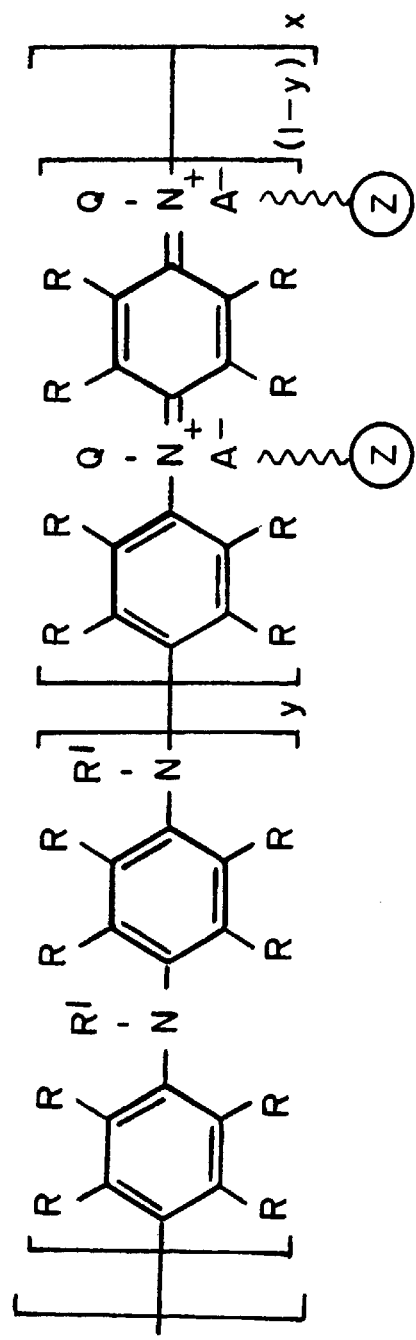
FIG. 6a shows polyaniline doped with a dopant of the form QA—Z, e.g., a protonic acid with pendant hydrogen bonding functionality.
Figure 6B:
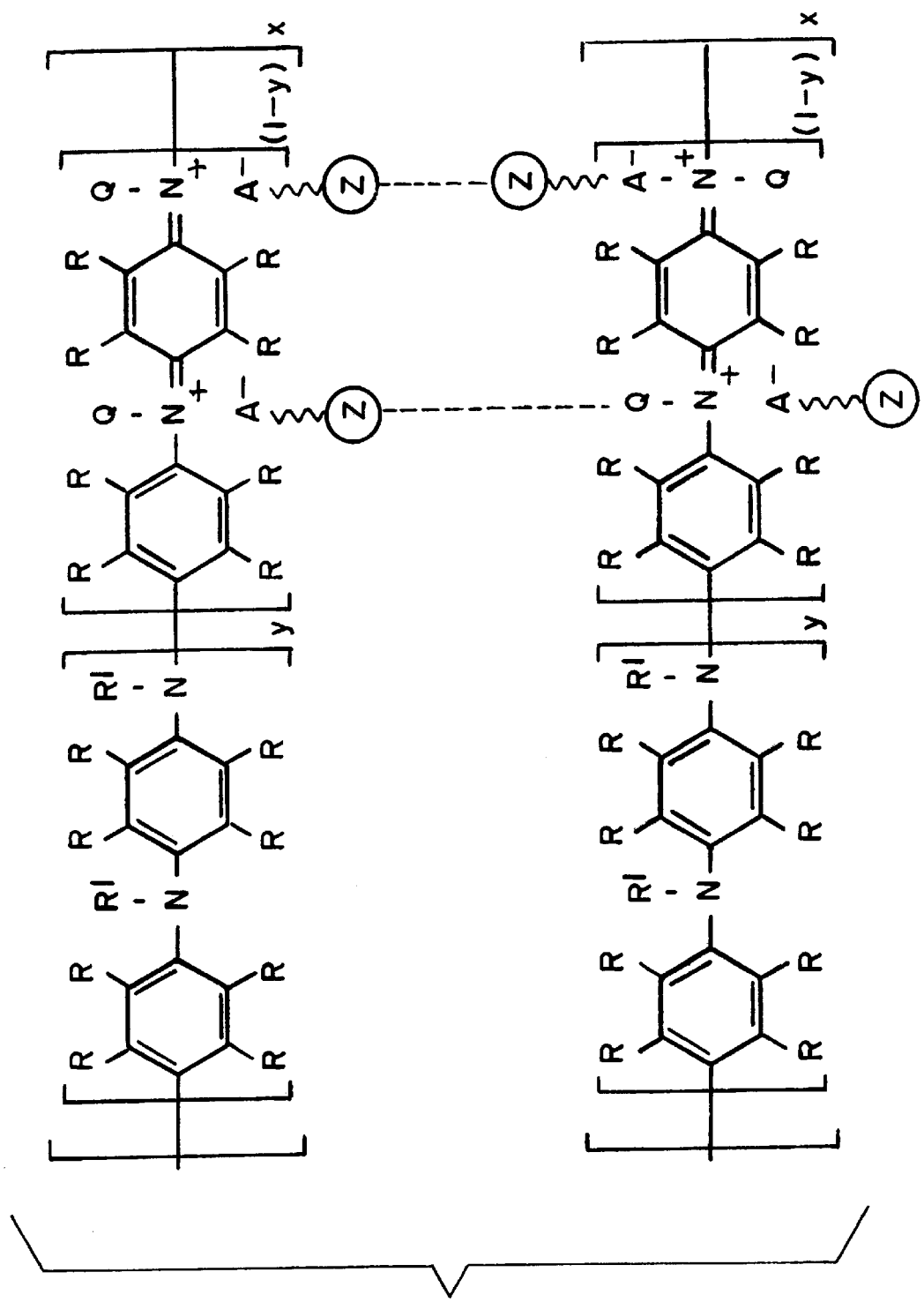
FIG. 6b shows two polyaniline chains cross-linked, e.g., through hydrogen bonding between Z and Z and Z and Q, wherein Q is H.

Doping of polyaniline base with protonic acids with pendent hydrogen bonding functionality having the structure QA—Z wherein Q is a hydrogen and Z represents the hydrogen bonding functionality results in a doped polymer having the structure shown in FIG. 6a in which the counteranion A- of the polyaniline contains pendent groups (Z) that can hydrogen bond either with another Z of a second chain or the same chain or it can hydrogen bond with N—Q sites or N—$R^1$ sites (in this case Q and $R^1$ being H), if Z provides the site to which a hydrogen bond is formed or Z can provide the hydrogen which hydrogen bonds to a site on $R^1$ or Q or Z can hydrogen bond with R, if R contains a hydrogen bonding site which hydrogen bonds to a hydrogen bonding site on Z or R can contain hydrogen or any combination thereof. FIG. 6b shows hydrogen bonding between Z of one chain to Z of another chain and also between Z of one chain and Q–N of another chain forming a hydrogen bonding network. As a result of the hydrogen bonding, interchain interactions are increased. In addition, the dopant is "locked" between chains by hydrogen bonding, specific examples follow.

Polyaniline base powder was doped with an 1 N aqueous solution of 4-sulfophthalic acid, sodium salt by stirring the powder heterogeneously with the dopant acid solution for 12 hours. The doped powder was filtered; washed with excess acid dopant solution; washed with water, and rinsed with isopropanol. The powder was dried by placing in a vacuum oven at 50° C. for 12 hours. The conductivity of the polymer was 10 S/cm.

A polyaniline base film cast from NMP was also doped with an aqueous acid solution of the above dopant. The film was allowed to sit in the dopant solution for 24 hours. The film was then washed as above. The conductivity was 10 S/cm.

Figure 1:
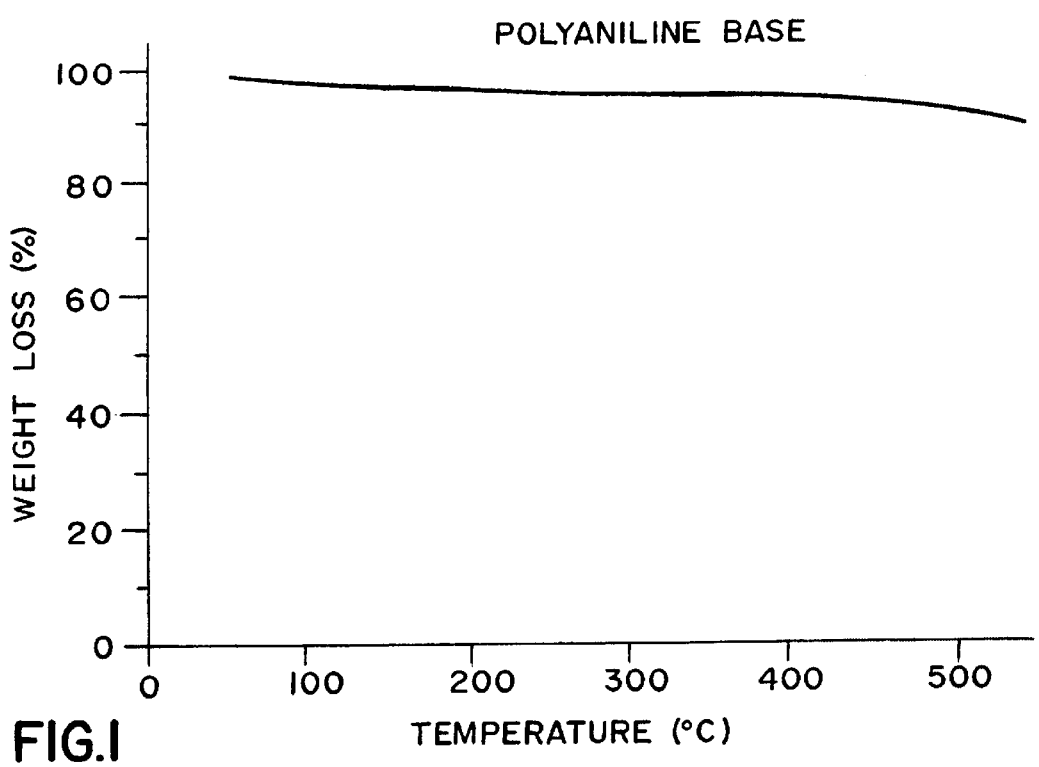
FIG. 1 is a thermogravimmetric analysis (TGA) curve of weight loss vs. temperature of polyaniline base.
Figure 2:
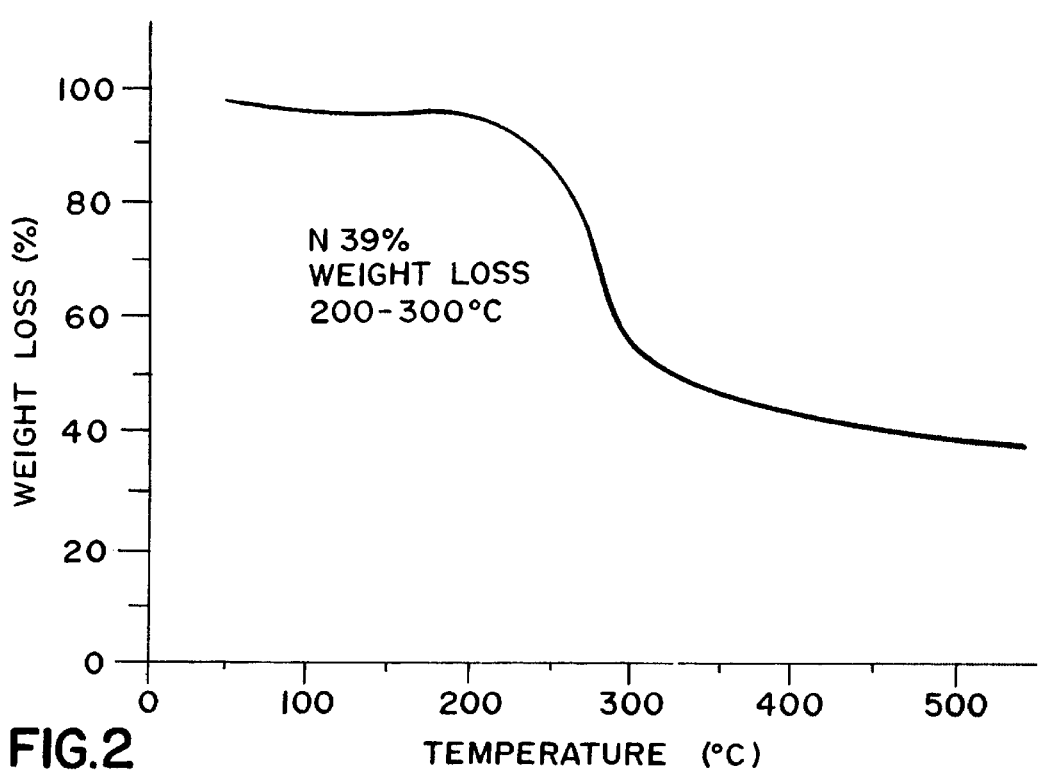
FIG. 2 is a thermogravimmetric analysis of Versicon™ (Trademark of Allied Signal), a polyaniline doped with a typical dopant.
Figure 8:
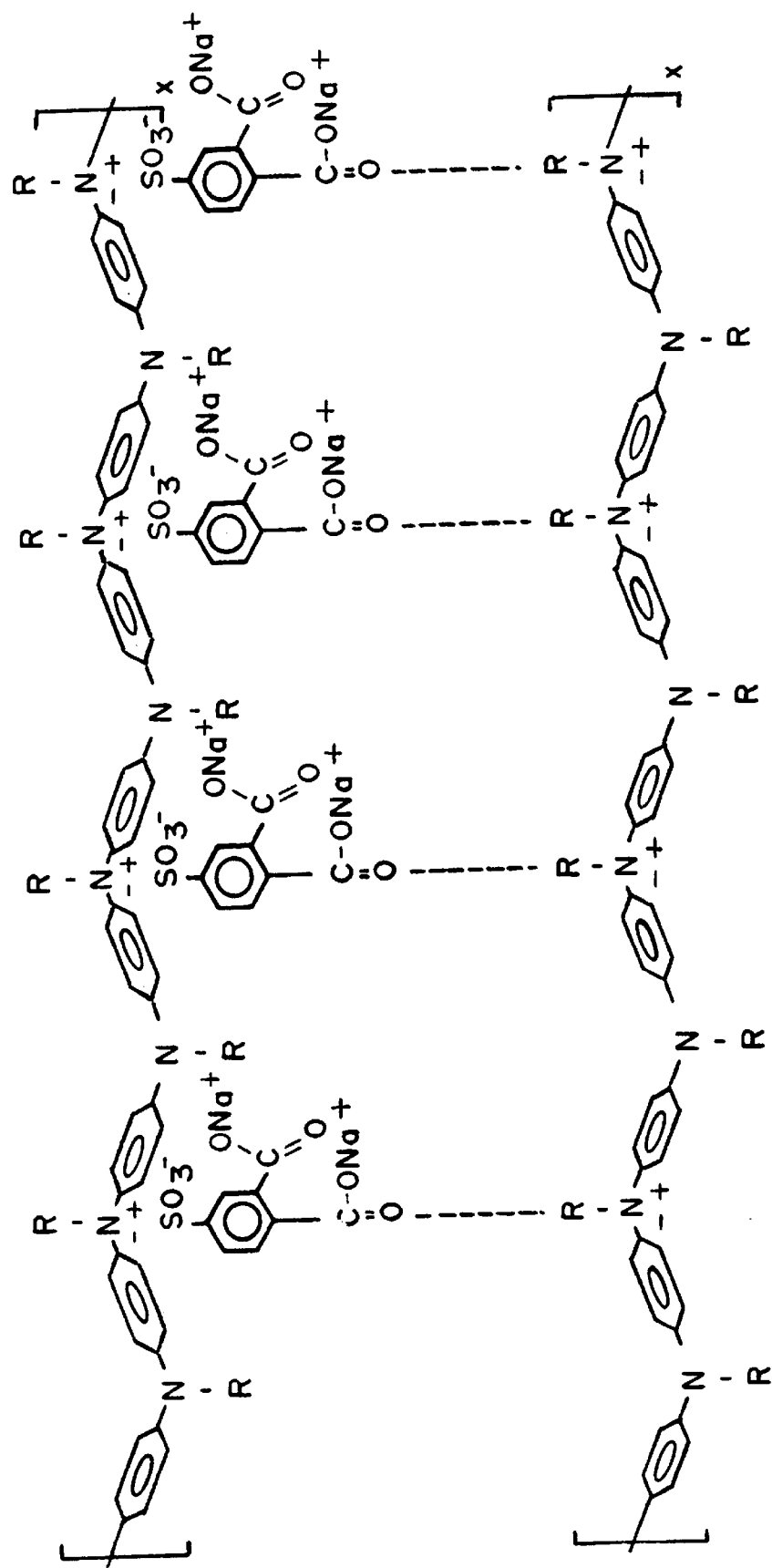
FIG. 8 shows polyaniline doped with 4-sulfophthalic acid sodium salt and the hydrogen-bonding interactions that are possible between two such polyaniline chains.

An alternate method of using this dopant is to in-situ polymerize aniline in the presence of the aqueous acid solution. To 13.87 g aqueous solution of 4-sulfophthalic acid (5% solution) was added 2.5 g aniline. This solution was allowed to cool to 0° C. To the cooled solution was added 1.53 g of the oxidant, ammonium peroxydisulfate. Within minutes, the reaction turned green and a powder precipitated, the polyaniline: 4-sulfophthalic acid sodium salt doped material. The reaction was allowed to stir for 4 hours after which the powder was isolated by filtering and washing as above. This powder has a conductivity of 10 S/cm. The TGA of this material is shown in FIG. 7. As can be seen, the material exhibits superior thermal stability as compared to the Versicon® shown in FIG. 2. The Versicon exhibits a 39% weight loss between 200 and 300° C. whereas the current pani (the polyanilines formed according to the present invention has only a 2.5% weight loss between 200 and 300° C. In addition, only a 7.6% weight loss is found between 300 and 400° C. Clearly, this material exhibits high thermal stability. This is consistent with the intermolecular hydrogen bonding that the dopant can induce as a result of the pendant carboxylate groups as shown in FIG. 8 forming a network structure from which the dopant is less easily removed. The polyaniline that was doped heterogeneously with the sulfophthalic acid sodium salt gave identical properties to the in-situ polymerized material.

The doping can also be carried out in solution by reacting the polyaniline base in N-methylpyrrolidinone or m-cresol, for example, with the dopant. Depending on the particular dopant, the doped polyaniline material will either stay in solution or precipitate as a powder. In the former case, the solution can be used to process films via spin-coating, spray-coating, etc. Other examples of protonic acid dopants with pendant hydrogen-bonding functionality (QA—Z) include but are not limited to the following. The acid can be a sulfonic acid, a carboxylic acid, a phosphoric acid, a boronic acid, a phosphoric acid, etc. The hydrogen bonding functionality can include a hydroxy group, a carboxylate group, a carboxylic acid group, a sulfonic acid group, a sulfonic acid group, an amino group, an amido group, a keto group, a thiol group, etc. The dopant can be aliphatic or aromatic in nature. Representative examples of dopants having form QA—Z and pendant hydrogen bonding functionality are 4,4 diaminostilbene-2,2 disulfonic acid, aminonaphthalenesulfonic acid and those show in FIG. 19.

2. Protonic Acid Dopants With Pendant Chemical Cross-Linkable Groups

Figure 9A:
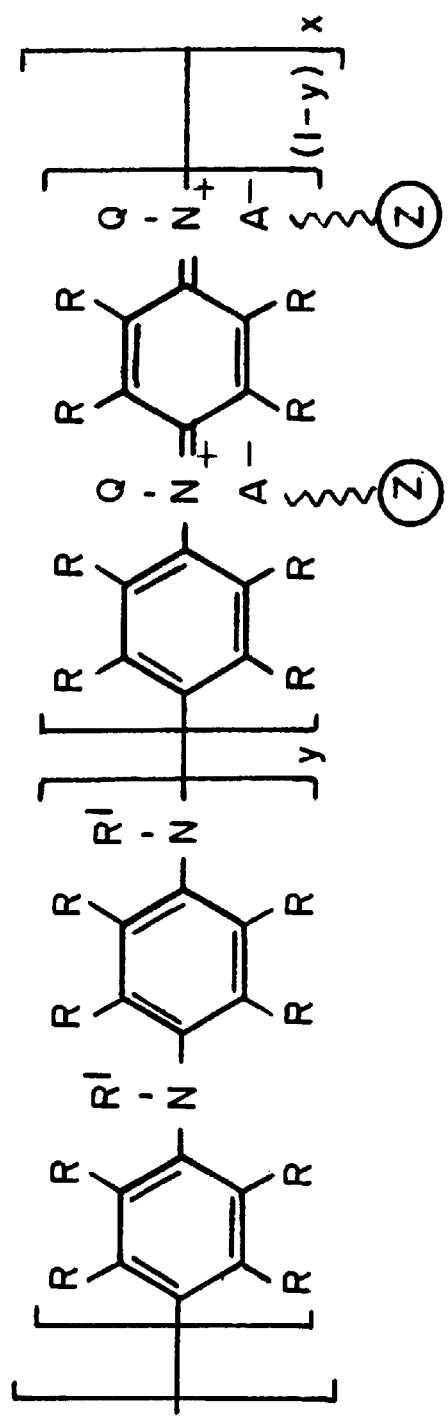
FIG. 9a shows polyaniline doped with a dopant of the form QA—Z, e.g., a protonic acid dopant with pendant chemical cross-linkable groups.
Figure 9B:
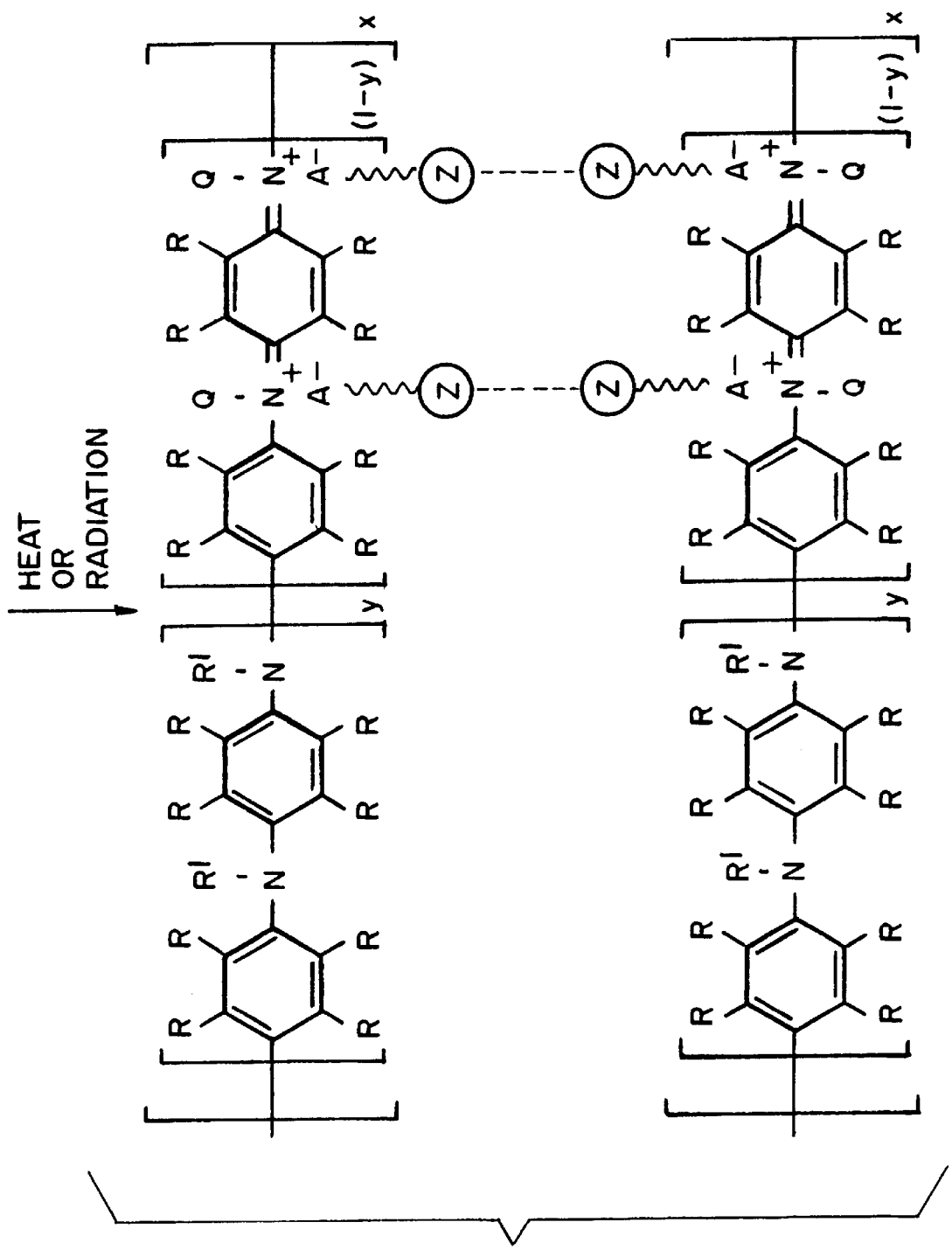
FIG. 9b shows two polyaniline chains cross-linked through Z to Z bonding, wherein the cross-linking is initiated with energy, e.g., heat or radiation.

Another type of dopant that can introduce interchain cross-linking in polyaniline is characterized as a protonic acid with pendant chemical cross-linkable groups such as QA—Z, wherein Z is a group that can undergo chemical cross-linking forming covalent bonds, e.g. C—C by exposure to energy, e.g., heat or radiation. Doping of polyaniline base with such materials results in the doped form shown in FIG. 9a, whereby the counteranion has the pendant cross-linkable groups. The material in this form can be processed by solution casting techniques into film form or some structural part and subsequently exposed to radiation or heat to induce chemical cross-linking. The cross-linking can occur between Z of one chain to Z of another chain as shown in FIG. 9b or between one Z and another Z of the same chain or to R or $R^1$ or any other group on the polyaniline backbone, if these are also cross-linkable groups. Interchain interactions are again increased in the doped polyaniline backbone. An example of such a dopant is 2-acrylamido-2-methyl-1-propanesulfonic acid.

Polyaniline base was dissolved in NMP to ≅5% solids. To this solution was added 2-acrylamido-2-methyl-1-propanesulfonic acid powder. The ratio of polyaniline (repeat unit of 4 rings; two imine sites) to the dopant was 1 mole polyaniline to 2.2 moles of the dopant. Within minutes, the blue solution turned green, indicative of doping. The doped polyaniline remains in solution. No precipitate is formed. The reaction was allowed to proceed for 12 hours. Precaution was taken to exclude light to prevent cross-linking from occurring. The solution was filtered through a 0.45 millipore filter.

The NMP solution of the doped polyaniline was used to spin coat thin films on the order of $0.5\mu$ on a variety of substrates. In addition, surprisingly, thick (150 $\mu$m) flexible free standing films can be solution cast from an NMP solution of this material. This material exhibits excellent solubility and processability as compared to other doped polyanilines previously reported. Furthermore, these films can be stretch oriented by mechanical stretching while heating the films to ~100° C. Stretch ratios of 8× has been attained.

The conductivity of films of this material cast from NMP prior to stretch orientation is 0.1 S/cm. Polyaniline doped with a conventional dopant, camphorsulfonic acid (CSA) has conductivity $10^{-2}$ S/cm, one order of magnitude lower and its solubility is very limited in NMP, not exceeding 3% solids. The polyaniline doped with acrylamidopropanesulfonic acid is soluble to concentrations exceeding 5% solids in NMP.

In addition, the CSA doped polyaniline cannot be processed into flexible free standing films nor can it be stretch oriented as can the current polyaniline. The higher conductivity of this dopant is consistent with the presence of the conjugated acrylamide group that is present in the counter-anion. It can facilitate the transport of the carriers as compared to the CSA system.

The above doping reaction was also carried out in NMP/LiCl, m-cresol, and hexafluoroisopropanol. Conductivities on the order of 1, 50, and 100 S/cm are attained in each solvent respectively. Another method of incorporating this dopant into polyaniline is by the polymerization of aniline in an aqueous solution of the acrylamidopropanesulfonic acid. The doped polyaniline precipitates from solution. The material synthesized in this fashion has a conductivity of 1 S/cm. It cannot, however, be dissolved.

To initiate cross-linking of the pendant acrylamide group, a radical initiator, benzoyl peroxide, was added to the NMP solution of this material. A film was spun of the polymer solution containing the initiator and subsequently heated on a hot plate at 90° C. to initiate the cross-linking. A relatively abrasion resistant film was attained after cross-linking which was less permeable to water and thus less prone to dedoping by water.

Cross-linkable monomers or polymerizable oligomers can be blended with the NMP solution of the polyaniline/acrylamidopropanesulfonic acid which upon cross-linking will form a cross-linked interpenetrating network with the polyaniline. For example, 1,3 butylene glycol diacrylate or hydroxyethyl methacrylate was added in an amount ranging from 1 to 25% by weight relative to polyaniline. No incompatibility was observed. Benzoyl peroxide was added to the solution. The solution was then used to spin-coat films of the mixture. The film was heated to 90° C., upon which cross-linking began. A highly abrasion resistant coating was attained that had excellent environmental stability as it was less permeable to solvents, alkaline solutions, and water.

The above cross-linking can be initiated with radiation such as electron-beam, ultraviolet/visible, x-ray, etc. A conducting resist is attained by selective exposure to radiation. The exposed regions are no longer soluble whereas, the unexposed regions are and can be removed with NMP or other organic solvents.

Other examples of protonic acids with pendant cross-linkable groups include but are not limited to the following. The acid can be a sulfonic acid, a carboxylic acid, a phosphoric acid, a boronic acid, a phosphonic acid, etc. The cross linkable group can be an acrylate, methacrylate, acrylamide, styrene, epoxy, urethane, allyl, siloxane, propargyl, etc. Specific examples include styrenesulfonic acid, beta-styrenesulfonic acid, vinylsulfonic acid, 2-methyl-2-propenesulfonic acid, 3-allyloxy-2-hydroxy-1-propanesulfonic acid, 3-sulfopropylmethacrylate, etc.

Cross-linkable monomers/oligomers that can be formulated with the above doped polyanilines-include acrylates, methacrylates, epoxies, styrenes, urethanes, etc. Specific examples as well as a list of possible initiators and sensitizers can be found in U.S. patent application Ser. No. 08/058,303, filed May 10, 1993 and U.S. patent application Ser. No. 08/875,171, filed Apr. 28, 1992, the teachings of which are incorporated herein by reference.

3. Non-Protonic Acid Dopants with Pendant Hydrogen Bonding Functionality

Figure 10A:
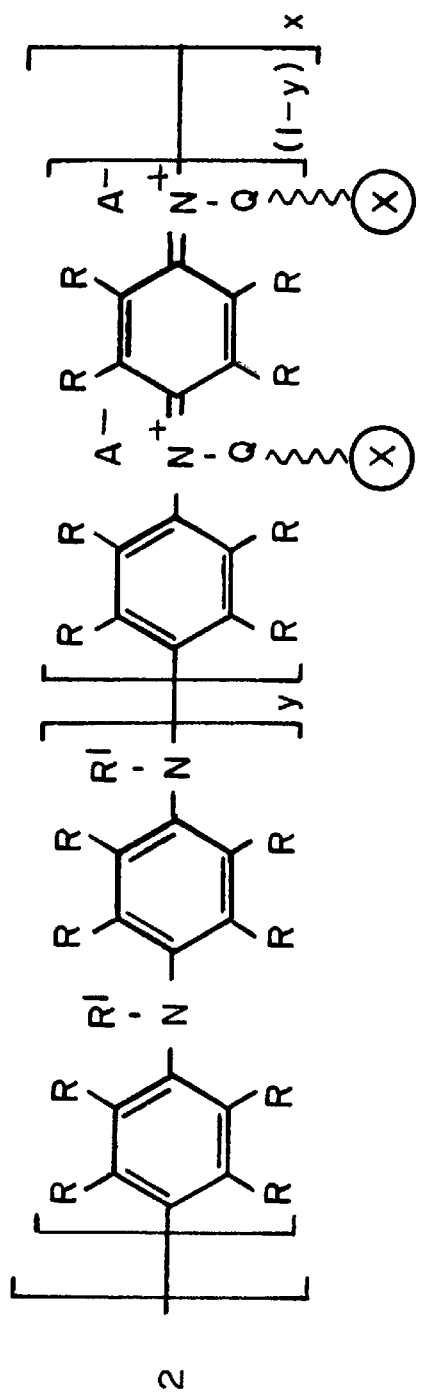
FIG. 10a shows polyaniline doped with a dopant of the form X—QA, e.g., an organic type dopant with pendant hydrogen bonding functionality.

Dopants other than protonic acids can be used to dope the polyaniline. These include alkylating agents such as alkylhalides, alkyltosylates, acid chlorides, anhydrides, sulfonyl chlorides, metal ions,. These type of dopants can be characterized as Lewis acids or electrophiles, herein referred to as organic dopants. Organic dopants result in a covalent bond between the imine N of the polyaniline base and for example the C of the alkylating agent, e.g. (N—C). Organic dopants of the type X—QA having pendant hydrogen bonding functionality, X, can be used to dope polyaniline base resulting in the structure depicted in FIG. 10a.

Figure 10B:
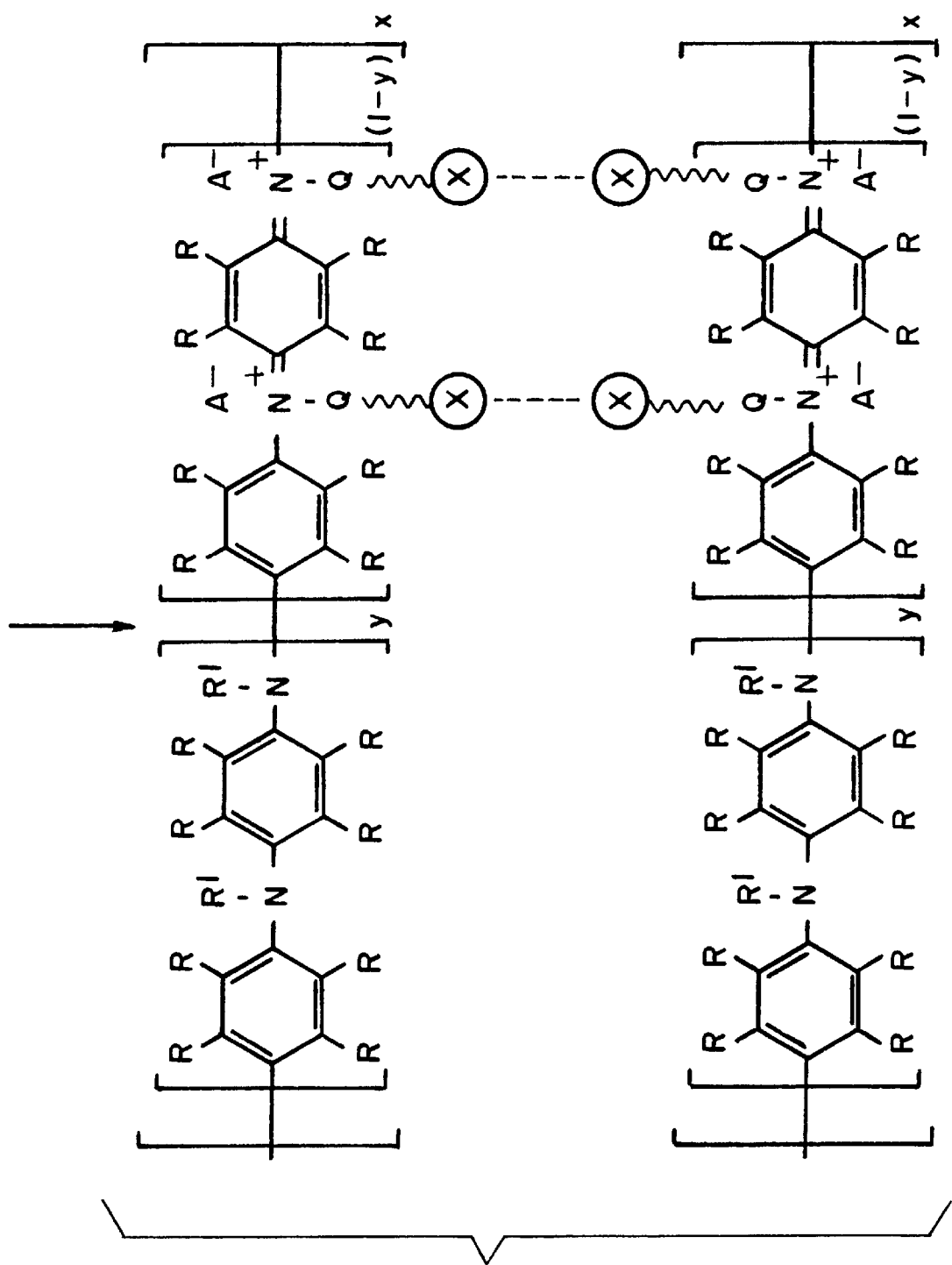
FIG. 10b shows two polyaniline chains cross-linked, e.g., through hydrogen bonding between X and X.

Such dopants allow main chain cross-linking in this case hydrogen bonding (FIG. 10b) to occur as opposed to cross-linking through the counteranion of the polymer as described in the previous case. Hydrogen bonding can occur between X of one chain to X of another chain or X of one chain with another X of the same chain, or X with R or $R^1$ if these contain hydrogen bonding functionality. FIG. 10b depicts Hydrogen bonding between X of one chain and X of a second chain.

A preferred example of such a dopant is 3-(chlorosulfonyl) benzoic acid. These reactions are carried out by reacting the polyaniline base in solution e.g. NMP with the appropriate dopant under an inert atmosphere.

Other such dopants (X—QA) include QA=alkyl halides, arylhalides, sulfonyl chlorides, acid chlorides, anhydrides, alkyltosylates, metal ions, etc. with pendant hydrogen bonding functionality, X=hydroxy group, an amido group, a keto group, a carboxylate group, a carboxylic acid group, a sulfonic acid group, a sulfonate group, an amino group, etc. These dopants can be aliphatic or aromatic; multifunctional as well. Additional examples are shown in FIG. 17.

Figure 11:
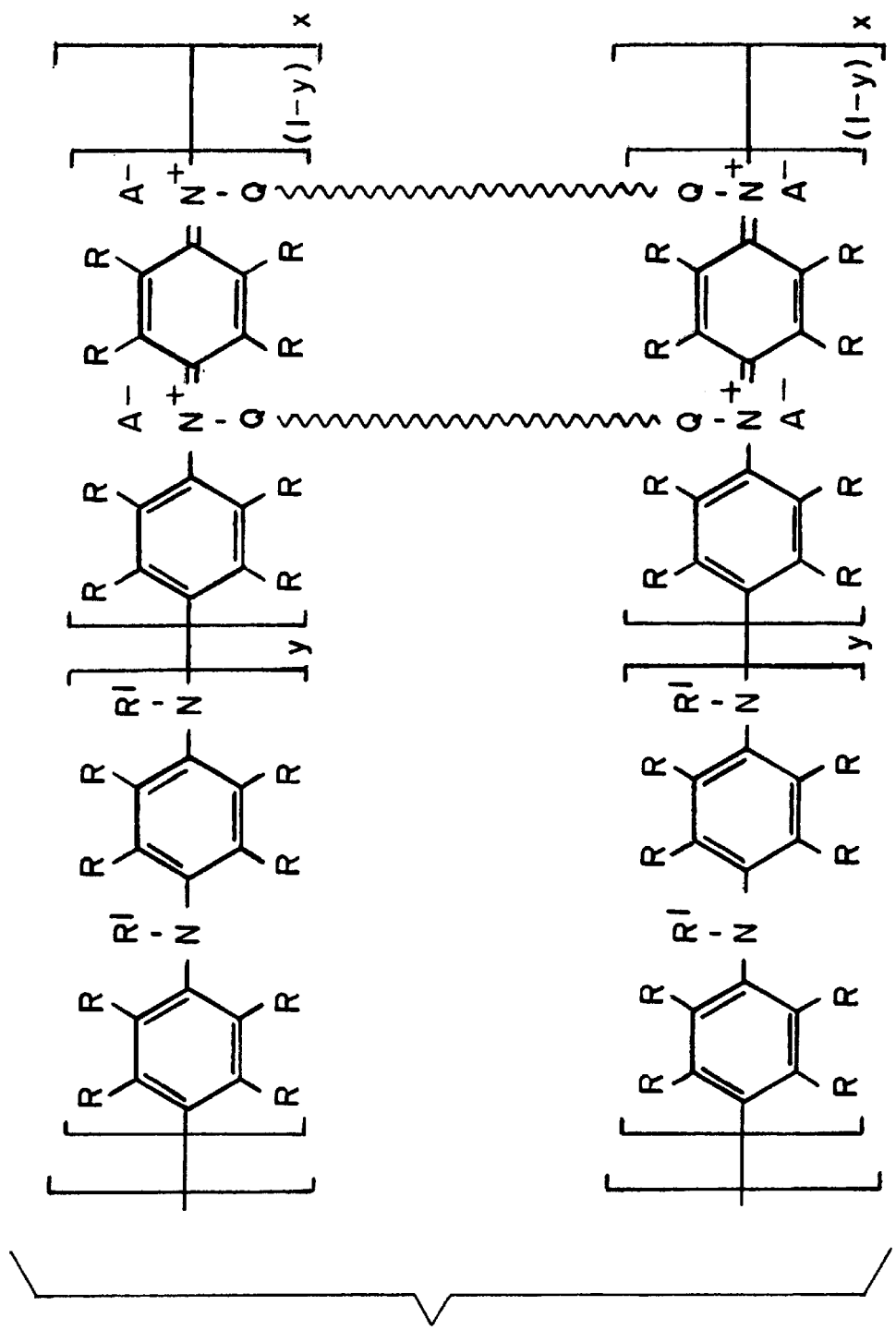
FIG. 11 shows two polyaniline chains cross-linked, e.g., with a bifunctional organic type dopant of the form AQ—QA.

4. Non Protonic Acid Dopants with Pendant Chemical Cross-Linkable Groups a. Bifunctional Organic Dopants One type of organic dopant that can induce chemical cross-linking between chains is one having the structure X—QA wherein X is also QA, that is having a bifunctional dopant AQQA which can interact with two pani chains as shown in FIG. 11. It is also possible that the dopant can interact with two imine nitrogens on the same chain, however, some degree of interchain cross-linking will be introduced into the polyaniline. In addition, if, for example, the Q functionality are linked by a conjugated group, this embodiment can introduce a conjugated pathway between chains in that if the dopant is selected appropriately, a conjugated group on the main chain of the polymer will be interlinked with another chain thereby providing an efficient pathway for the conducting carriers to go from one chain to another as compared to simply hopping from one chain to another. QA, as stated above, can be an alkyl halide, aryl halide, alkyl tosylate, aryl tosylate, acid chloride, sulfonyl chlorides, anhydrides, etc.

A list of examples of organic bifunctional dopants (AQ—QA) is shown in FIG. 18. These would introduce some conjugation between chains.

b. Monofunctional Organic Dopants with Pendant Unsaturated Groups, i.e. Cross-Linkable Groups.

Figure 12A:
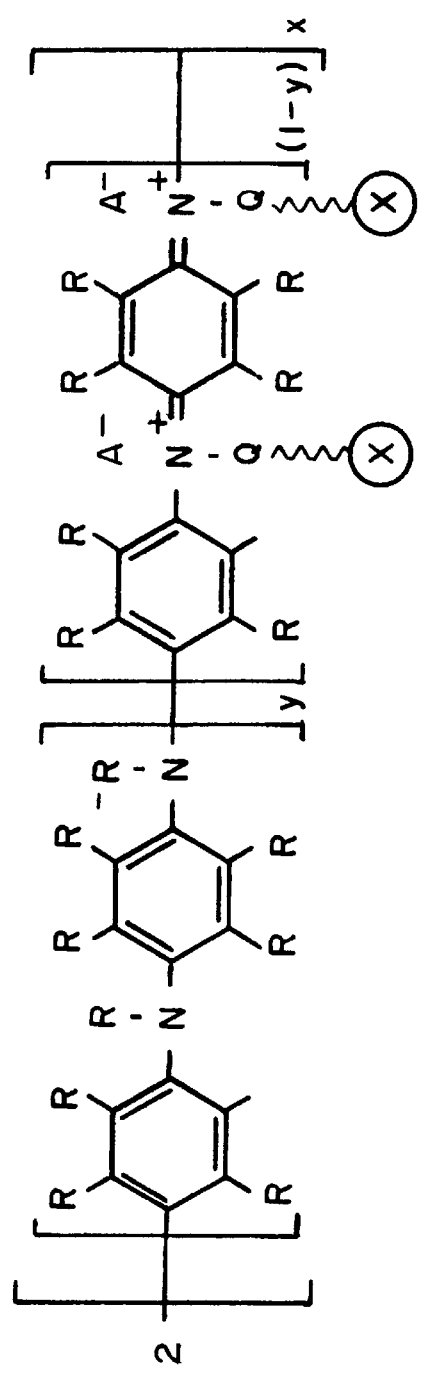
FIG. 12a shows polyaniline doped with a dopant of the form X—QA, an organic type dopant with pendant chemical cross-linkable groups.
Figure 12B:
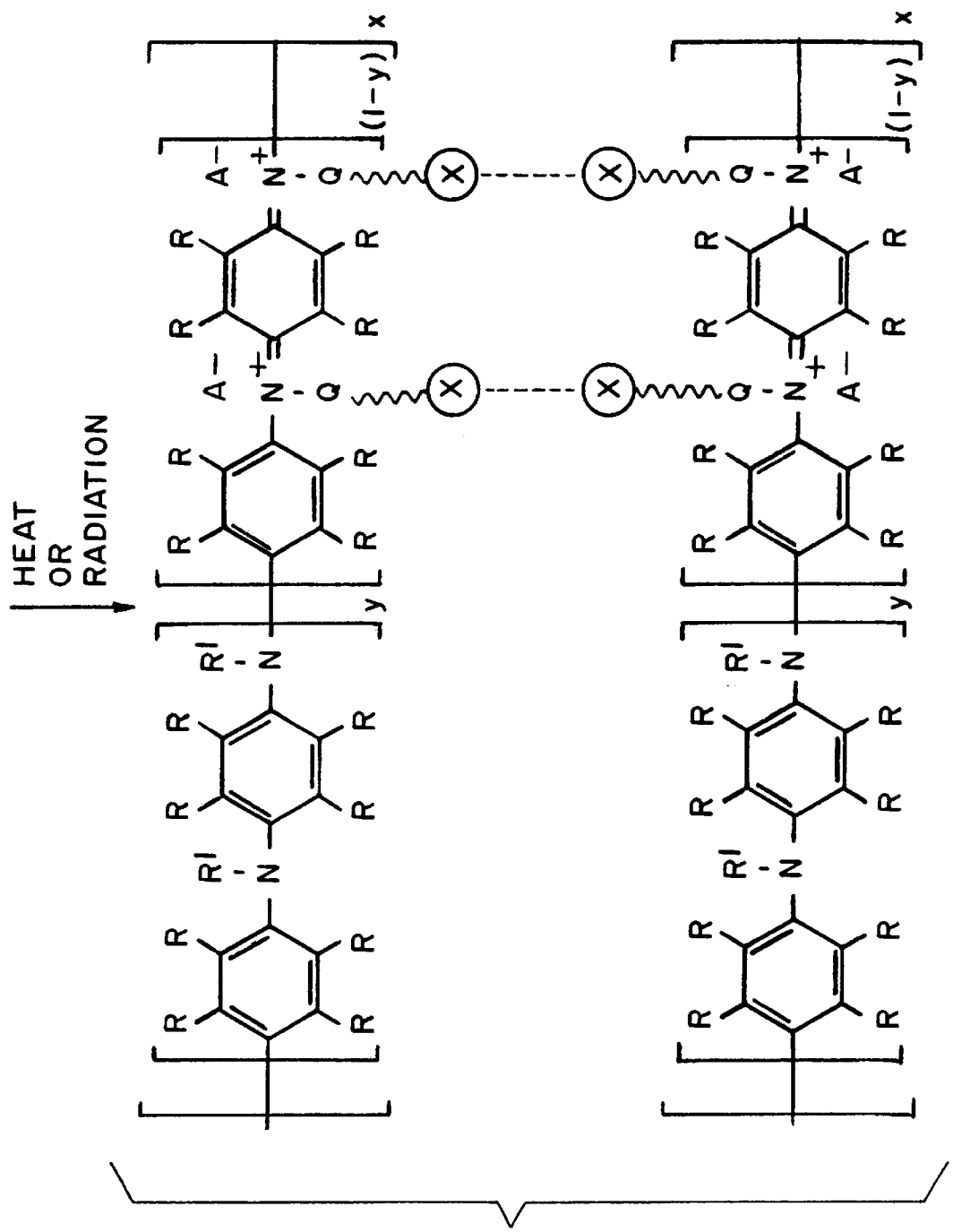
FIG. 12b shows two polyaniline chains cross-linked through chemical bonding between X and X, wherein the cross-linking is initiated by energy, e.g. heat or radiation.

Organic dopants having the structure (X—QA), wherein X is a group that has unsaturated groups or cross-linkable groups can be used to dope polyaniline resulting in the structure depicted in FIG. 12a. The material in the doped form can be processed into film form or into a structural part and subsequently cross-linked resulting in a cross-linked polyaniline network FIG. 12b. Such dopants can also incorporate a conjugated pathway between chains.

A preferred example of such a dopant is methacryloyl chloride. Polyaniline base was dissolved in NMP to 5% solids. Methacryloyl chloride (stochiometric amount) was added to the polyaniline and allowed to react under an inert atmosphere. The isolated doped polyaniline exhibited a conductivity of 20 S/cm, higher than achieved with protonic acids under the same experimental conditions. The higher conductivity is constant with the unsaturated group on the side chain which can help interchain carrier mobility. Similar results were attained by reacting a polyaniline base film cast from NMP with methacryloyl chloride.

Radical initiators can be added to the above NMP solution of the doped film. The solution can then be spin-applied to form a film and upon heating or exposing to the appropriate radiation, cross-linking is initiated. In addition, unsaturated oligomers or monomers of other materials can be added to the above doped solutions in a similar manner to that described above to result in highly cross-linked coatings which have good conductivity and environmental stability.

Other examples of such dopants include but are not limited to: propargyl bromide, allyl bromide, methacryloyl chloride (discussed above), acryloyl chloride, any alkyl halide, aryl halide, sulfonyl chloride, acid chloride, anhydride, etc. with pendant unsaturation or polymerizable; cross-linkable groups such as acrylate, methacrylate, epoxy, styrene, allyl, siloxane, urethane, propargyl, etc.

The above examples are exemplary only and the present invention is not limited thereto. In addition, any combination of the above dopants can be used to tailor the properties of the doped polyaniline. In addition, it may be desirable to incorporate a small amount of controlled cross-linking between chains so as to get the optimum interchain enhancement for carrier mobility enhancement without significant perturbation of the polyaniline structure. This can be accomplished by combining various ratios of any of the above dopants with a non-cross linkable dopant. Such dopants include, hydrochloric acid, camphorsulfonic acid, toluenesulfonic acid, dodecylbenzenesulfonic acid, acetic acid, formic acid, methyl iodide, benzyl bromide, etc. The % of cross-linkable dopant relative to non-cross-linkable dopant can be from 0.0001 to 100%, more preferably from 0.1% to 50% and most preferably from 0.5 to 25%. This can be done by reacting the polyaniline base in solution, e.g. NMP, m-cresol, hexafluoroisopropanol, etc. with two or more dopants of appropriate ratio. For example, camphorsulfonic acid and acrylamidopropanesulfonic acid in various ratios can be added to an NMP solution of the polymer and allowed to react. The final doped polyaniline encompasses both dopants. By controlling the amount of cross-linkable dopant, the degree of cross-linking can be controlled.

5. Cross-Linkable Substituents on the Aromatic Rings

Figure 13:
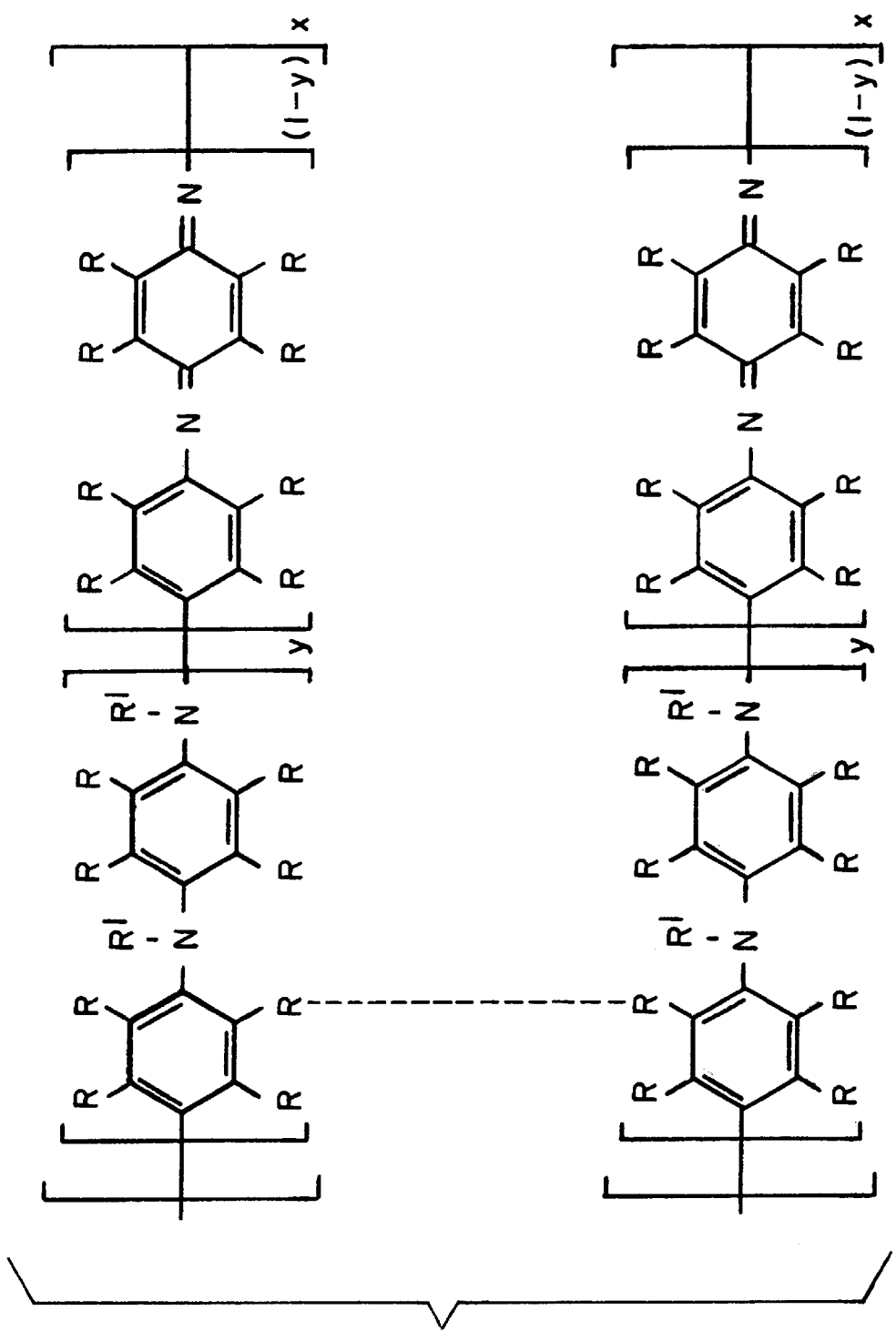
FIG. 13 shows two polyaniline chains in the non-doped or precursor form cross-linked through interaction between ring substituents R to R.

Another way to introduce cross-linking into the polyaniline is by incorporating substituents on the aromatic ring wherein R contains a cross-linkable functionality either hydrogen bonding or actual chemical cross-linking. The R can cross-link or hydrogen bond with another R group from another chain, the same chain, or to the N—$R^1$ if appropriate or to the dopant if it is in the doped form. FIG. 13 depicts cross-linking from one R group to another in the non-doped form of the polymer or precursor form. Not all the R groups need to be the same.

The incorporation of substituents on the polyaniline aromatic rings is generally accomplished by the polymerization of the appropriate substituted aniline monomer. For example, 2-aminophenethylalcohol was added to an aqueous 1 N HCl acid solution. To this solution was added the oxidant, ammonium peroxydisulfate, also in aqueous HCl acid. Upon addition of the oxidant, the monomer begins to polymerize and within 30 minutes the polymer precipitates from the solution. The polymerization reaction is allowed to proceed for 3 to 4 hours at which time the polymer:hydrochloride salt is filtered, washed with excess HCl and rinsed with water. This isolates the HCl doped hydroxyethyl substituted polyaniline (—CH2CH2OH). The material can be converted to the non-conducting base form by neutralization with ammonium hydroxide. The base form of the polymer has excellent solubility in a number of solvents and can be processed into films, etc. The material can subsequently be doped with an array of dopants including the cross-linkable dopants. The above polymer can also be made by electrochemical polymerization.

Copolymers were made by polymerizing aniline with 2-aminophenethyl alcohol at different ratios. Copolymers allows the introduction of controlled amounts of hydrogen bonding. An entire series of polymers were made ranging from 0 to 100% hydroxyethyl content.

The hydroxymethyl (—CH2OH) substituted polyaniline and copolymers composed of hydroxymethylaniline and unsubstituted aniline were also prepared in a similar fashion to that described above.

Figure 14:
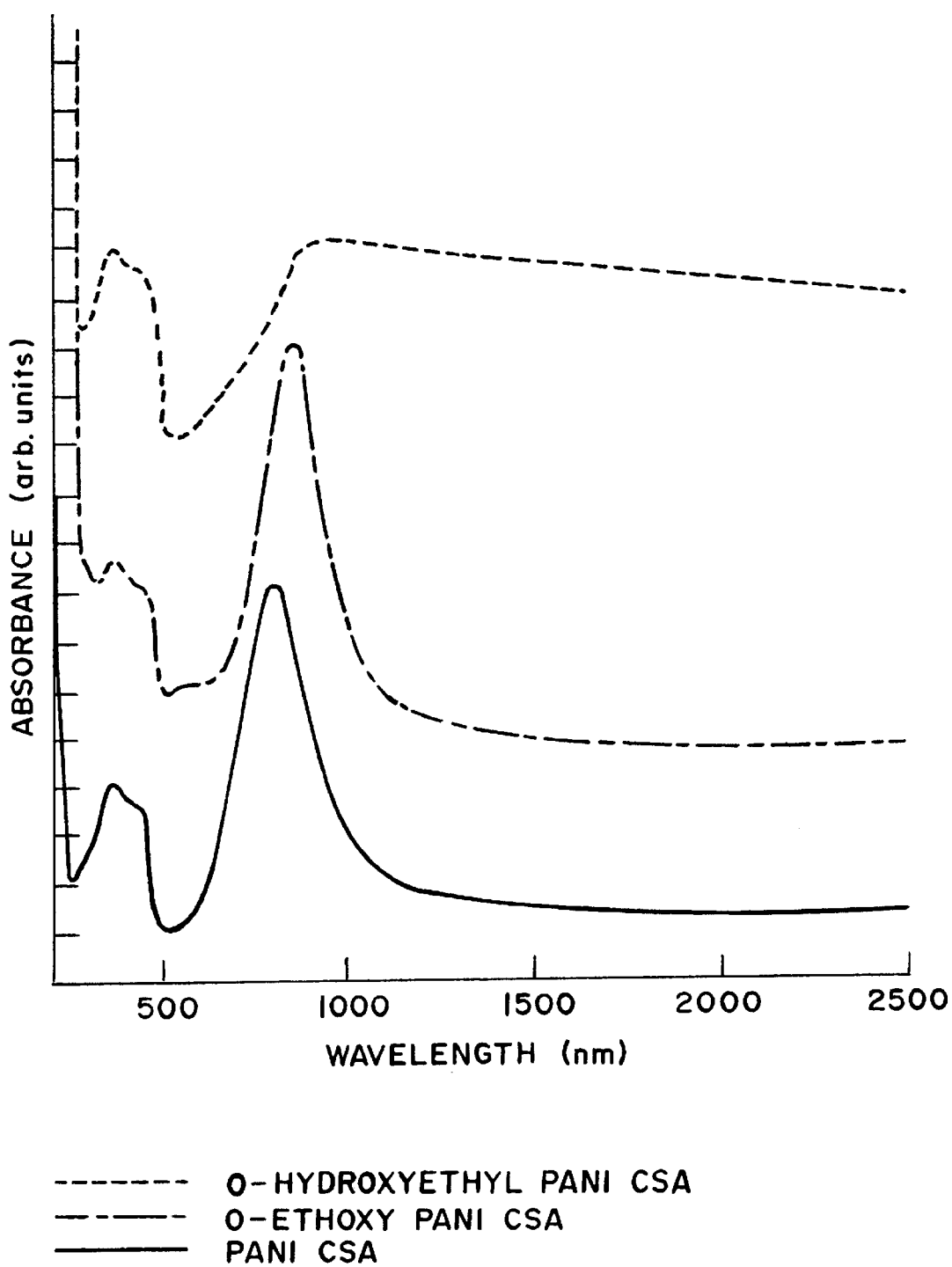
FIG. 14 compares the ultraviolet/visible/near infra-red absorbance of the unsubstituted polyaniline, the o-ethoxy substituted polyaniline, and the o-hydroxyethyl substituted polyaniline. All are doped with camphorsulfonic acid in Nmp.

Incorporation of ring substituents on the polyaniline backbone has always resulted in a decrease in the conductivity of the polymer as compared to the unsubstituted homopolymer. This is due to steric constraints imposed by the substituent which disrupt the coplanarity of the aromatic rings and thus decrease the intrachain conjugation. In addition, the interchain distance increases because the substituent acts as a spacer between chains. The increased interchain distance makes interchain carrier mobility more difficult and thus the conductivity decreases. The incorporation of the hydroxyethyl substituent and hydroxy methyl substituent described above is found not to decrease the conductivity but to actually increase the conductivity. FIG. 14 shows the absorbance spectra for the unsubstituted polyaniline, the hydroxyethyl homopolymer and for an ethoxy substituted polyaniline doped with camphorsulfonic acid. Both the unsubstituted polymer and the ethoxy substituted polymers have a localized polaron peak which is indicative of localized carriers whereas the hydroxyethyl polyaniline exhibits a delocalized free carrier tail extending to the near infra-red indicative of delocalized carriers. In addition, the conductivity of the hydroxyethyl polymer is 3 S/cm, whereas $10^{-2}$. S/cm is attained for the unsubstituted homopolymer and $10^{-6}$. S/cm is attained for the ethoxy substituted polymer. It should be noted that the ethoxy substituted polyaniline and the hydroxyethyl substituted polymer basically have the same geometric constraint however significantly higher conductivity is attained with the hydroxyethyl substituent. Interchain hydrogen bonding which brings the chains closer together and facilitates interchain mobility can cause this. Indeed, wide angle x-ray scattering (WAXS) measurements indicate that the $2\Delta$ increases from 19 to 22 to 23 for the unsubstituted polyaniline, hydroxyethyl substituted polyaniline and for the hydroxymethyl substituted respectively which shows that the interchain distance has decreased with the h-bonding substituents. In addition, better interaction with the solvent can be attained with the hydroxyethyl substituted polyaniline due to the better solvent interaction with the hydroxyl group which can give rise to an expanded coil conformation. The expanded coil conformation gives higher intrachain mobility. The R can be any aliphatic or aromatic group that have pendant hydrogen bonding functionality or pendant cross-linkable functionality. Hydrogen bonding functionality include hydroxyl, amido, a keto, a carboxylate, a carboxylic acid, a sulfonic acid, a thiol, an amino, etc. Cross-linkable functionality include acrylate, methacrylate, propargyl, allyl, epoxy, styrene, siloxane, etc. Specific examples or R are shown in FIG. 16.

6. Cross-Linkable Substituents on the Amine Nitroqens

Figure 15:
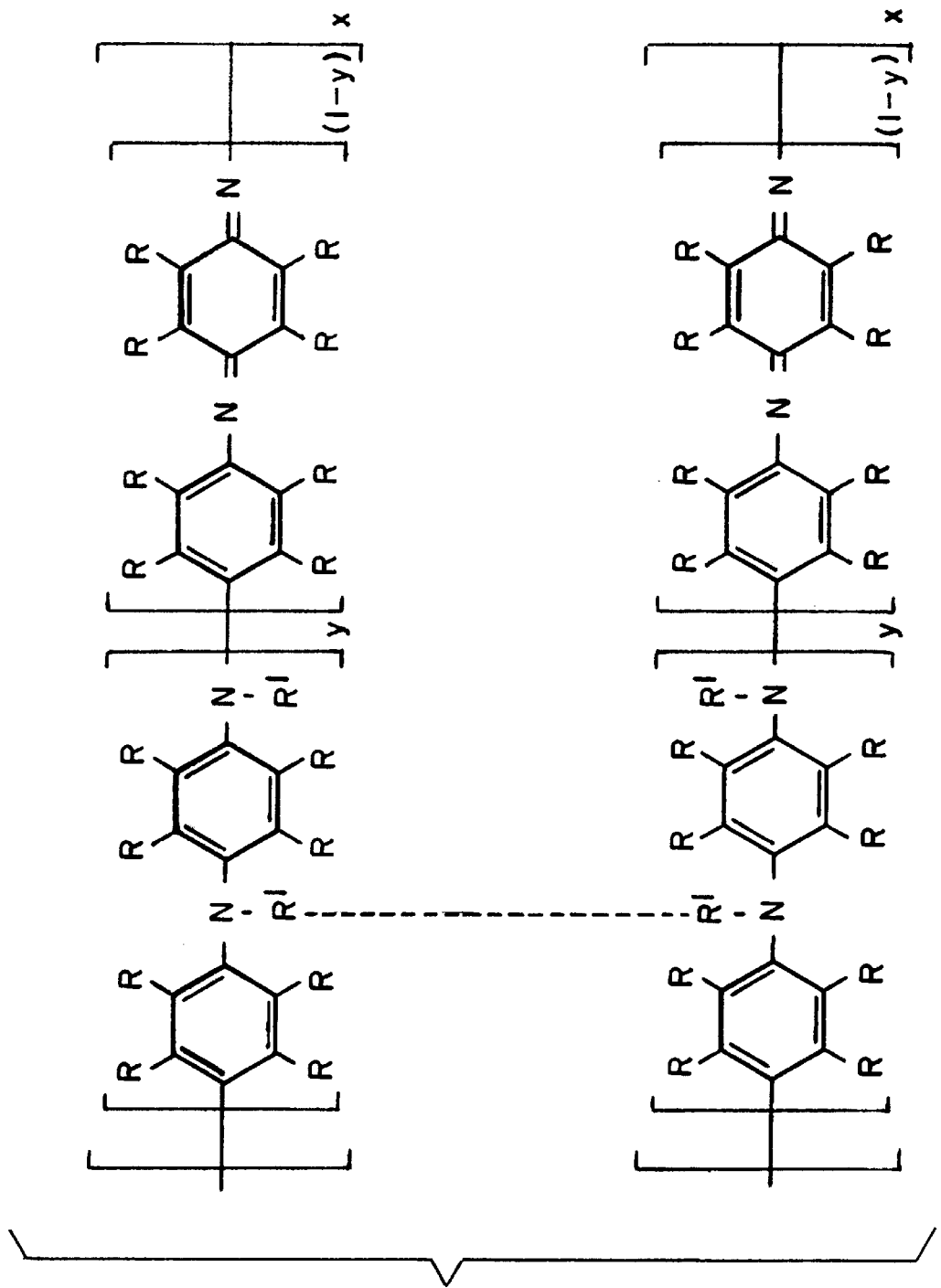
FIG. 15 shows two polyaniline chains in the non-doped or precursor form cross-linked through interactions between amine substituents ($R^1$ to $R^1$).

Incorporation of cross-linkable substituents $R^1$ on the amine nitrogens of polyaniline is another route to introducing cross-linking into the polymer as is shown in FIG. 15 which depicts cross-linking from one '$R^{1}$' to another. This type of substitution can be accomplished by the oxidative polymerization of the appropriately N-substituted aniline monomer. For example, N-hydroxyethyl substituted aniline (Aryl-NH—CH2CH2OH) was oxidatively polymerized in a manner similar to that described above. Copolymers are made by the polymerization of this monomer with other aniline derivatives. The substituents can be either hydrogen bonding or chemically cross-linkable as discussed above.

The various embodiments outlined herein can be combined in any form. In addition, the cross-linkable substituents and/or dopants can be combined with non-cross-linkable substituents and/or dopants. For example, o-ethoxyaniline can be polymerized with 2-aminophenethylalcohol to give polyaniline copolymers having non-cross-linkable groups, ethoxy, and hydrogen bonding groups, hydroxyethyl.

The degree of cross-linking can be controlled by the % substituent or dopant that is incorporated which is cross-linkable. The % substituent can be controlled by the feed ratio of the aniline monomers used in the polymerization reaction. The amount of cross-linkable dopant can be controlled by the stochiometry used during doping.

The above formulations can be combined with other cross-linkable matrixes consisting of monomers, oligomers, polymers such as acrylates, methacrylates, epoxies, siloxanes, urethanes, acetylenes, etc. to form highly cross-linked, conducting thermosets. The above formulations can be combined with thermoplastic polymers to form conducting blends. The above formulations can be used as conducting adhesives, electrostatic discharge protective materials, conducting resists, electromagnetic interference shielding materials, electrolytic or electroless metallization for corrosion protection of steel and metal surfaces, discharge layers for electron-beam lithography, discharge layers for scanning electron microscopy inspection, interconnections, electroluminescent layers, semiconductors for devices such as transistors, diodes, etc.

The materials described herein and the materials described in U.S. application Ser. No. 08/370,127 filed on Jan. 9, 1995 and Ser. No. 08/370,128 filed on Jan. 9, 1995 which are incorporated by reference herein can be used as gas separation membranes. Gases include He, H2, CO2, Ar, O2, N2, etc. The materials can be processed in appropraite solvents and cast into films on a support backing or can be cast as free-standing films.

While the present invention has been described with respect to preferred embodiments, a person of skill in the art can apply the teaching to other embodiments, numerous modifications, changes, and improvements will occur to those skilled in the art without departing from the spirit and scope of the invention.

What is claimed is:

1. A structure comprising:
   a composition comprising precursors to an electrically conductive polymer wherein said precursor comprises covalent crosslinks and solvent solvating enhancing functionality said crosslinkable functionality is selected from the group consisting of hydrogen bonding functionality and chemical cross-linkable functionality selected from the group consisting of hydroxyethyl and hydroxymethyl groups.

2. A structure according to claim 1, wherein said composition of precursors to an electrically conductive polymer includes a dopant.

3. A structure according to claim 1, wherein an electrically conductive polymer formed from said composition has an electrical conductivity which is greater than the electrical conductivity of said electrically conductive polymer without said cross-links.

4. A structure according to claim 1, wherein said composition is a free standing film.

5. A structure according to claim 1, wherein said cross-links are formed from cross-linkable functionality on the backbone of said precursors.

6. A structure according to claim 1, wherein said precursor is selected from the group consisting of substituted polyparaphenylene vinylenes, polyparaphenylenes, polyanilines, polythiophenes, polyazines, polyfuranes, polypyrroles, polyselenophenes, poly-p-phenylene sulfides, polyacetylenes and combinations thereof.

7. A structure according to claim 1, wherein said precursor is selected from the group consisting of substituted polyparaphenylene vinylenes, polyparaphenylenes, polyanilines, polythiophenes, polyazines, polyfuranes, polypyrroles, polyselenophenes, poly-p-phenylene sulfides, polyacetylenes and combinations thereof.

8. A structure according to claim 1, wherein said composition is cross-linked in an amount greater than 0%.

9. A structure according to claim 2, wherein said dopant has a structural formula selected from the group consisting of AQX and QAZ wherein Q is a cationic species, A is a counter anion and X and Z are groups containing said cross-linkable functionality.

10. A structure according to claim 2, wherein said dopant is selected from the group consisting of a dopant with cross-linkable functionality and a dopant without cross-linkable functionality and combinations thereof.

11. A structure according to claim 2, wherein said dopant includes a conjugated constituent.

12. A structure according to claim 1, wherein said cross-linked form of said composition is a cross-linked electrically conductive polymer comprising said precursor doped with a dopant having structural formula selected from the group consisting of AQX and QAZ, wherein Q is a cationic species, A is a counter anion and X and Z are groups containing said cross-linkable functionality, said cross-linked electrically conductive polymer has cross-links selected from the group consisting of interactions between said X groups, between said Z groups, between molecules of said precursor and within a molecule of said precursor and interactions between said Z groups and said X groups and between said X groups, said Z groups.

13. A structure according to claim 1, further including a material which is not said precursor or said electrically conductive polymer, said material being selected from the group consisting of a material having cross-linkable functionality and a material with out cross-link functionality.

14. A structure according to claim 1, wherein said composition further includes a material which is not said precursor, said material being cross-linked to said composition.

15. A structure according to claim 1, wherein said composition has conjugated cross-links.

16. A structure according to claim 1, wherein said composition is blended with another material.

17. A structure according to claim 1, wherein said precursor is a polyaniline.

18. A structure according to claim 1, wherein said composition is a cross-linked form of polyaniline.

19. A structure according to claim 18, wherein said polyaniline is doped with a dopant selected from the group consisting of a protonic acid having pendant hydrogen bonding functionality, protonic acid having pendant chemical cross-linkable functionality, non-protonic acid having pendant hydrogen bonding functionality, non-protonic acid having pendant chemical cross-linkable functionality.

20. A structure according to claim 1, wherein said covalent cross-links are through cross-linkable functionality selected from the group consisting of cross-linkable functionality on aromatic rings and cross-linkable functionality on an amine nitrogen atom.

21. A structure according to claim 1, wherein said cross-link functionality sufficiently overcomes steric constraints of said solvent solvation functionality by holding adjacent precursor molecules sufficiently close together that the doped form of said precursor has an increase in electrical conductivity.

22. A structure according to claim 1, wherein said cross-linked form of said composition comprises a cross-linked network if a dopant, said precursor is disposed within said network and doped to a conducting form of said precursor by said network.

23. A structure according to claim 1, wherein said cross-linked form of said composition comprises a cross-linked network of said precursor, said dopant is disposed within said network and dopes said precursor to the conductive form of said precursor.

24. A structure according to claim 1, wherein said structure is selected from the group consisting of conducting adhesives, electrostatic discharge protective materials, conductive blends, gas separation membranes conducting resists, electromagnetic interference shielding materials, electrolytic, metallization or electroless metallization for corrosion protection of steel and metal surfaces, discharge layers for electron-beam lithography, discharge layers for scanning electron microscopy inspection, electrical interconnections, electroluminescent layers and semiconductors for devices.

25. A structure according to claim 1, wherein covalent cross-links are formed from chemical bonding functionality selected from the group consisting of acrylates, methacrylates, epoxies, styrenes, propargyl and allyl.

26. A structure according to claim 11 wherein said conjugated group contains unsaturated functionality.

27. A structure according to claim 1 wherein said precursor contains a conjugated constituent.

28. A structure according to claim 1 wherein said composition is a polyaniline doped with a dopant selected from the group consisting of 4-sufophthalic acid sodium salt, methacryloyl chloride and 2-acrylamido-2-methyl-1-propanesulfonic acid.

29. A structure according to claim 1 wherein said composition is a polyaniline doped with a dopant selected from the group consisting of 4-sufophthalic acid sodium salt, methacryloyl chloride and 2-acrylamido-2-methyl-1-propanesulfonic acid.

30. A structure according to claim 1, wherein said covalent crosslinks are formed from chemical cross-link functionality which comprises unsaturated groups.

31. A structure according to claim 1 wherein said covalent crosslinks are formed from crosslinkable functionality selected from the group consisting of:

—CH$_2$CH$_2$OH, —CH$_2$OH, —CH$_2$SH, —CH$_2$CH$_2$SH, —CH$_2$CH$_2$COOH, —CH$_2$COOH, —CH$_2$SO$_3$H, —CH$_2$CH$_2$SO$_3$H, —COOH, —SO$_3$H, —COO$^-$m$^+$, —SO$_3^-$m$^+$, —C≡CH, —C=CH$_2$,

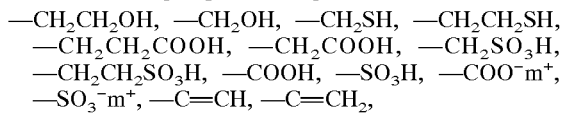

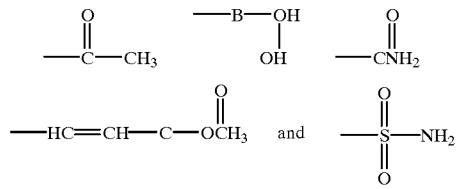

wherein m$^+$ is counterion to provide charge neutrality.

32. A structure comprising a cross-linked product of precursors to an electrically conductive polymer, said precursors have crosslinkable substituents, said crosslinked product has covalent crosslinks between said crosslinkable substituents and solvent solvating enhancing functionality selected from the group consisting of hydroxyethyl and hydroxymethyl groups.

33. A structure according to claim 32 wherein said crosslinkable substituents are selected from the group consisting of:

—CH$_2$CH$_2$OH, —CH$_2$OH, —CH$_2$SH, —CH$_2$CH$_2$SH, —CH$_2$CH$_2$COOH, —CH$_2$COOH, —CH$_2$SO$_3$H, —CH$_2$CH$_2$SO$_3$H, —COOH, —SO$_3$H, —COO$^-$m$^+$, —SO$_3^-$m$^+$, —C≡CH, —C=CH$_2$,

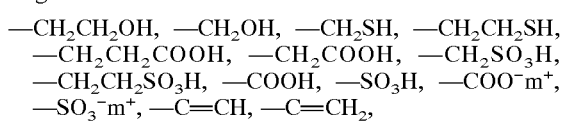

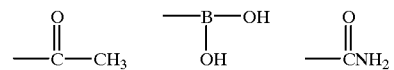

-continued

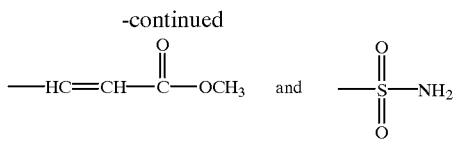

wherein m⁺ is counterion to provide charge neutrality.

34. A structure comprising a covalently crosslinked composition which has solvent solvating enhancing functionality, said composition being a precursor to an electrically conductive polymer, there being crosslinks between said precursors, said precursors comprise rings having crosslinkable substituents thereon, said crosslinks are between said substituents.

35. A structure according to claim 34 wherein said crosslinkable substituents are selected from the group consisting of:

—CH₂CH₂OH, —CH₂OH, —CH₂SH, —CH₂CH₂SH, —CH₂CH₂COOH, —CH₂COOH, —CH₂SO₃H, —CH₂CH₂SO₃H, —COOH, —SO₃H, —COO⁻m⁺, —SO₃⁻m⁺, —C≡CH, —C=CH₂,

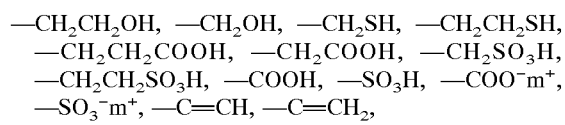

wherein m⁺ is counterion to provide charge neutrality.

36. A structure comprising a covalently crosslinked composition, said composition being a precursor to an electrically conductive polymer, there being crosslinks between said precursors, said precursors comprise first crosslinkable substituents on the backbone said precursors and said precursors comprise rings having second crosslinkable substituents and solvent solvating functionality selected from the group consisting of hydroxyethyl and hydroxymethyl groups.

37. A structure according to claim 36 wherein said crosslinkable substituents are selected from the group consisting of:

—CH₂CH₂OH, —CH₂OH, —CH₂SH, —CH₂CH₂SH, —CH₂CH₂COOH, —CH₂COOH, —CH₂SO₃H, —CH₂CH₂SO₃H, —COOH, —SO₃H, —COO⁻m⁺, —SO₃⁻m⁺, —C≡CH, —C=CH₂,

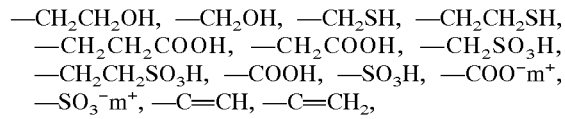

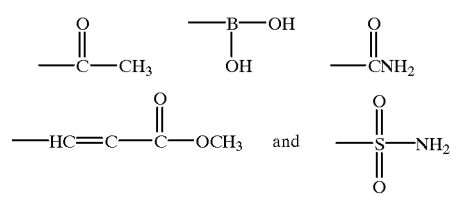

wherein m⁺ is counterion to provide charge neutrality.

38. A structure comprising a precursor to an electrically conductive polymer comprising radiation induced crosslinks said precursor comprises covalent crosslinks and solvent solvating enhancing functionality selected from the group consisting of hydroxyethyl and hydroxymethyl groups.

39. A structure according to claim 38 wherein said radiation induced crosslinks are induced by radiation selected from the group consisting of electron beam radiation, ultraviolet radiation, visible radiation and x-ray radiation.

40. A structure comprising a precursor to an electrically conductive polymer comprising crosslinks and a crosslink initiator, said precursor comprises covalent crosslinks and solvent solvating enhancing functionality selected from the group consisting of hydroxyethyl and hydroxymethyl groups.

41. A structure comprising a precursor to an electrically conductive polymer comprising crosslink functionality capable of crosslinking at a temperature of about 90° C., said precursor comprises covalent crosslinks and solvent solvating enhancing functionality selected from the group consisting of hydroxyethyl and hydroxymethyl groups.

42. A structure comprising a crosslinked precursor to an electrically conductive polymer which is a reaction product of an initiator and a precursor to an electrically conductive polymer, said precursor comprises covalent crosslinks and solvent solvating enhancing functionality selected from the group consisting of hydroxyethyl and hydroxymethyl groups.

43. A structure comprising a crosslinked precursor to an electrically conductive polymer which comprises radiation initiated crosslinks, said precursor comprises covalent crosslinks and solvent solvating enhancing functionality selected from the group consisting of hydroxyathyl and hydroxymethyl groups.

44. A structure comprising a crosslinked precursor to an electrically conductive polymer which comprises crosslinks initiated by other than heat, said precursor comprises covalent crosslinks and solvent solvating enhancing functionality selected from the group consisting of hydroxyethyl and hydroxymethyl groups.

* * * * *